United States Patent
Na et al.

(10) Patent No.: US 12,141,410 B2
(45) Date of Patent: Nov. 12, 2024

(54) ELECTRONIC APPARATUS

(71) Applicant: Samsung Display Co., LTD., Yongin-si (KR)

(72) Inventors: Hyunjae Na, Yongin-si (KR);
Hirotsugu Kishimoto, Yongin-si (KR);
Yong-Kwan Kim, Yongin-si (KR);
Seokwon Jang, Yongin-si (KR); Chul Ho Jeong, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/370,012

(22) Filed: Sep. 19, 2023

(65) Prior Publication Data

US 2024/0160329 A1      May 16, 2024

(30) Foreign Application Priority Data

Nov. 10, 2022  (KR) .................. 10-2022-0149553

(51) Int. Cl.
  *G06F 3/046*   (2006.01)
  *G06F 3/041*   (2006.01)
(52) U.S. Cl.
  CPC ............ *G06F 3/046* (2013.01); *G06F 3/0412* (2013.01); *G06F 3/04164* (2019.05); *G06F 2203/04102* (2013.01); *G06F 2203/04111* (2013.01)
(58) Field of Classification Search
  CPC ................ G06F 1/1618; G06F 3/0412; G06F 2203/04111
  See application file for complete search history.

(56) References Cited

U.S. PATENT DOCUMENTS

| | | |
|---|---|---|
| 9,678,604 B2 | 6/2017 | Lee |
| 2021/0333944 A1 | 10/2021 | Jung |

(Continued)

FOREIGN PATENT DOCUMENTS

| | | |
|---|---|---|
| EP | 4016262 A1 | 6/2022 |
| EP | 4286999 A1 | 12/2023 |

(Continued)

OTHER PUBLICATIONS

Bohn, Dieter, How Samsung beefed up its new folding phones: metal, tape, and a dab of goo. [online] pp. 1-16, Aug. 12, 2021. URL: https://www.theverge.com/22619139/samsung-galaxy-z-fold-3-flip-screen-durability-waterproog-aluminium.

(Continued)

*Primary Examiner* — Kevin M Nguyen
(74) *Attorney, Agent, or Firm* — CANTOR COLBURN LLP

(57) ABSTRACT

An electronic apparatus includes a display panel and a digitizer disposed under the display panel and provided with a plurality of holes defined therethrough to overlap the folding region. The digitizer includes a first base layer, first loop coils including first first coils and second first coils, a second base layer disposed under the first base layer, second loop coils including first second coils and second second coils, and interposed between the first base layer and the second base layer, and bridge patterns. A first first line included in one bridge pattern is connected to a corresponding first first coil, and a second first line included in the bridge pattern is connected to the second first coil which receives a signal the same as a signal of the first first coil.

30 Claims, 19 Drawing Sheets

(56) References Cited

U.S. PATENT DOCUMENTS

| | | |
|---|---|---|
| 2021/0357048 A1 | 11/2021 | Kishimoto et al. |
| 2022/0091632 A1 | 3/2022 | Hong et al. |
| 2023/0229194 A1* | 7/2023 | Kishimoto ............ G06F 1/1681 |
| | | 361/679.01 |
| 2023/0236629 A1* | 7/2023 | Kishimoto ............ G06F 1/1652 |
| | | 361/679.02 |

FOREIGN PATENT DOCUMENTS

| | | |
|---|---|---|
| KR | 101750564 B1 | 6/2017 |
| WO | 2022182012 A1 | 9/2022 |

OTHER PUBLICATIONS

Partial European Search Report for Application No. 23208122.4-1224 dated Apr. 4, 2024.

\* cited by examiner

ELECTRONIC APPARATUS

This application claims priority to Korean Patent Application No. 10-2022-0149553, filed on Nov. 10, 2022, and all the benefits accruing therefrom under 35 U.S.C. § 119, the content of which in its entirety is herein incorporated by reference.

BACKGROUND

1. Field

Embodiments of the present disclosure described herein relate to an electronic apparatus including a digitizer, and more particularly, relate to an electronic apparatus including a digitizer having improved folding characteristics.

2. Description of the Related Art

In an information-oriented society, the importance of electronic apparatus as visual information transmission media is emerging. The electronic apparatus is activated by receiving an electrical signal. The electronic apparatus may include a digitizer which senses an input applied from an outside of a display layer provided therein for displaying an image.

The digitizer of the electronic apparatus may include various sensing coils to be activated by the electrical signal. The region where the sensing coils are included may be activated responds to a signal applied from the outside.

SUMMARY

Embodiments of the present disclosure provide an electronic apparatus improved in a folding characteristic of a digitizer to sense an external input.

According to an embodiment of the present disclosure, an electronic device includes a display panel including a folding region folded along a folding axis extending in a first direction, and a first non-folding region and a second non-folding region which are spaced apart from each other in a second direction crossing the first direction while interposing the folding region therebetween, and a digitizer including a first non-folding part disposed under the display panel and overlapping the first folding region, a second non-folding part overlapping the second non-folding region, and a folding part overlapping the folding region and provided with a plurality of holes defined therein. In such an embodiment, the digitizer includes a first base layer, first loop coils disposed on the first base layer, where first loop coils include first first coils disposed in the first non-folding part and second first coils disposed in the second non-folding part; a second base layer disposed under the first base layer; second loop coils disposed between the first base layer and the second base layer, the second loop coils include first second coils disposed in the first non-folding part and second second coils disposed in the second non-folding part; and bridge patterns disposed under the second base layer. In such an embodiment, a first first line included in one bridge pattern of the bridge patterns and disposed in the first non-folding part is connected to a first first coil, which corresponds to the first first line, of the first first coils, and a second first line included in the one bridge pattern and disposed in the second folding part is connected to the second first coil, which receives a signal the same as a signal of the first first coil, of the second first coils.

In an embodiment, a first second line included in another bridge pattern of the bridge patterns and disposed in the first folding part may be connected to a first second coil, which corresponds to the first second line, of the first second coils, and a second second line included in the another bridge pattern and disposed in the second folding part may be connected to a second second coil, which outputs electromagnetic force the same as electromagnetic force of the first second coil, of the second second coils.

In an embodiment, the first loop coils may be connected to corresponding bridge patterns of the bridge patterns through first contact holes defined through the first base layer and the second base layer, and the second loop coils may be connected to corresponding bridge patterns of the bridge patterns through the second contact holes defined through the second base layer.

In an embodiment, the first contact holes and the second contact holes may not overlap the folding part.

In an embodiment, each of the first first coils and the second first coils may include first longer side lines extending in the second direction and spaced apart from each other in the first direction, first shorter side lines spaced apart from each other in the second direction and connected to the first longer side lines, a first connection part extending from one selected from the first longer side lines and the first shorter side lines, a first contact part connected to an end of the first connection part, a second connection part extending from another one selected from the first longer side lines and the first shorter side lines, and a second contact part connected to an end of the second connection part. In such an embodiment, the first contact part and the second contact part may be connected to relevant bridge patterns.

In an embodiment, the second connection part may overlap one selected from the first longer side lines and the first shorter side lines at a first crossing point, a portion, which is adjacent to the first crossing point, of the second connection part may be disposed on the second base layer. In such an embodiment, a remaining portion, which is disposed on the second base layer, of the second connection part is connected to the portion of the second connection part through contact holes defined in the first base layer.

In an embodiment, each of first second coils and second second coils may include second longer side lines extending in the first direction and spaced apart from each other in the second direction, second shorter side lines spaced apart from each other in the first direction and connected to the second longer side lines, a third connection part extending from one selected from the second longer side lines and the second shorter side lines, a third contact part connected to an end of the third connection part, a fourth connection part extending from another one selected from the second longer side lines and the second shorter side lines, and a fourth contact part connected to an end of the fourth connection part. In such an embodiment, the third contact part and the fourth contact part may be connected to bridge patterns, which correspond to the third contact part and the fourth contact part, respectively, of the bridge patterns, and may not overlap the first contact part and the second contact part included in each of the first loop coils.

In an embodiment, the fourth connection part may overlap one selected from the second longer side lines and the second shorter side lines at a second crossing point, a portion, which is adjacent to the second crossing point, of the fourth connection part may be disposed under the second base layer. In such an embodiment, a remaining portion of the fourth connection part may be connected to the one portion of the fourth connection part through contact holes defined in the second base layer.

In an embodiment, the digitizer may further include at least one sub-coil disposed in a layer the same as a layer of the second loop coils, and including a first third coil including at least a portion disposed on the folding part adjacent to the first non-folding part, and a second third coil including at least a portion disposed the folding part adjacent to the second non-folding part.

In an embodiment, the bridge patterns may include f or less our bridge patterns disposed between two holes, which are adjacent to each other in the first direction, of the holes.

In an embodiment, the holes extend in the first direction, and include a first group hole and a second group hole spaced apart from each other in the first direction. In such an embodiment, the second group hole may be spaced apart by a specific distance from the first group hole in the first direction.

In an embodiment, the electronic apparatus further includes a circuit board connected to a bridge board disposed under the second base layer overlapping one selected from the first non-folding part and the second non-folding part and connected to the first loop coils and the second loop coils, and a bridge board connected to the circuit board.

In an embodiment, the digitizer may further include a third base layer disposed under the second base layer, and sub-bridge patterns including at least a portion overlapping the folding part, connected to the relevant bridge patterns, and disposed on the third base layer.

In an embodiment, each of the first base layer and the second base layer may include a matrix including a filler and a reinforced fiber composite disposed in the matrix and including at least one selected from reinforced fiber and carbon fiber.

In an embodiment, the reinforced fiber composite may include at least one selected from epoxy, polyester, polyamide, polycarbonate, polypropylene, polybutylene, and vinyl ester, and the filler may include at least one selected from silica, barium sulphate, sintered talc, barium titanate, titanium oxide, clay, alumina, mica, boehmite, zinc borate, and zinc tartrate.

In an embodiment, the electronic apparatus may further include an adhesive layer interposed between the display panel and the digitizer, where an adhesive opening part may be defined in the adhesive layer to be overlapping the folding region.

In an embodiment, the electronic apparatus may further include a functional layer including a first part and a second part disposed under the digitizer and spaced apart from each other in a region overlapping the folding part. In such an embodiment, the functional layer may include at least one selected from a heat dissipation layer, a cushion layer, and a shielding layer.

In an embodiment, the digitizer may sense an external input through an electromagnetic resonance (EMR) method.

In an embodiment, the display panel may include a first region and a second region surrounding the first region and having a light transmittance lower than a light transmittance of the first region, in which each of the first region and the second region may provide an image. In such an embodiment, the electronic device may further includes a camera module disposed under the digitizer, and overlapping the first region.

In an embodiment, the electronic apparatus may further include a first cover layer disposed on the first base layer to cover the first loop coils and a second cover layer disposed under the second base layer to cover the bridge patterns. In such an embodiment, the holes may be defined through the first cover layer and the second cover layer.

According to an embodiment of the present disclosure, an electronic apparatus includes a display panel including a folding region folded along a folding axis extending in a first direction, and a first non-folding region and a second non-folding region which are spaced apart from each other in a second direction crossing the a direction while interposing the folding region therebetween, and a digitizer including a first non-folding part disposed under the display panel, and overlapping the first folding region, a second non-folding part overlapping the second non-folding region, and a folding part overlapping the folding region and provided with a plurality of holes defined therein. In such an embodiment, the digitizer includes a first base layer, first loop coils disposed on the first base layer, a second base layer disposed under the first base layer, second loop coils interposed between the first base layer and the second base layer, and bridge patterns disposed under the second base layer. In such an embodiment, at least one selected from the first loop coils and the second loop coils overlap the folding part, and the loop coils, which are spaced apart from each other while interposing the folding part therebetween, of the first loop coils and the second loop coils are connected to each other by the bridge patterns.

In an embodiment, the number of the first loop coils and the number of bridge patterns interposed between two holes, adjacent to each other in the first direction, of the holes are four or less.

In an embodiment, each of the second loop coils may include a first coil overlapping the first non-folding part and a second coil overlapping the second non-folding part. In such an embodiment, each of the first coils and the second coils may include longer side lines extending in the first direction and spaced apart from each other in the second direction, shorter side lines spaced apart from each other in the first direction and connected to the relevant longer side lines, a first connection part extending from one selected from the longer side lines and the shorter side lines, a first contact part connected to an opposite end of the first connection part, a second connection part extending from another one selected from the longer side lines and the shorter side lines, and a second contact part connected to an opposite end of the second connection part. In such an embodiment, the first contact part and the second contact part are connected to relevant bridge patterns.

In an embodiment, the second connection part may overlap one selected from the longer side lines and the shorter side lines at a crossing point, a portion, which is adjacent to the crossing point, of the second connection part may be disposed on the second base layer. In such an embodiment, Aa remaining portion of the second connection part is connected to the portion of the second connection part through contact holes defined in the first base layer.

In an embodiment, the digitizer may further include at least one sub-coil at least one sub-coil disposed in a layer the same as a layer of the second loop coils and including a first third coil including at least a portion disposed on the folding part adjacent to the first non-folding part, and a second third coil including at least a portion disposed the folding part adjacent to the second non-folding part.

In an embodiment, the electronic apparatus may further include a circuit board disposed under the second base layer overlapping one selected from the first non-folding part and the second non-folding part, and connected to the first loop coils and the second loop coils, and a bridge board connected to the circuit board.

In an embodiment, each of the first base layer and the second base layer may include a matrix including a filler and a reinforced fiber composite disposed in the matrix and including at least one selected from reinforced fiber and carbon fiber.

In an embodiment, the electronic apparatus may further include a functional layer including a first part and a second part disposed under the digitizer and spaced apart from each other in a region overlapping the folding part. In such an embodiment, the functional layer may include at least one selected from a heat dissipation layer, a cushion layer, and a shielding layer.

In an embodiment, the digitizer may sense an external input through an EMR method.

In an embodiment, the display panel may include a first region and a second region surrounding the first region and having a light transmittance lower than a light transmittance of the first region, in which each of the first region and the second region may provide an image. In such an embodiment, the electronic device may further include a camera module disposed under the digitizer, and overlapping the first region.

BRIEF DESCRIPTION OF THE DRAWINGS

The above and other features of the present disclosure will become apparent by describing in detail embodiments thereof with reference to the accompanying drawings.

DETAILED DESCRIPTION

Figure 1A:
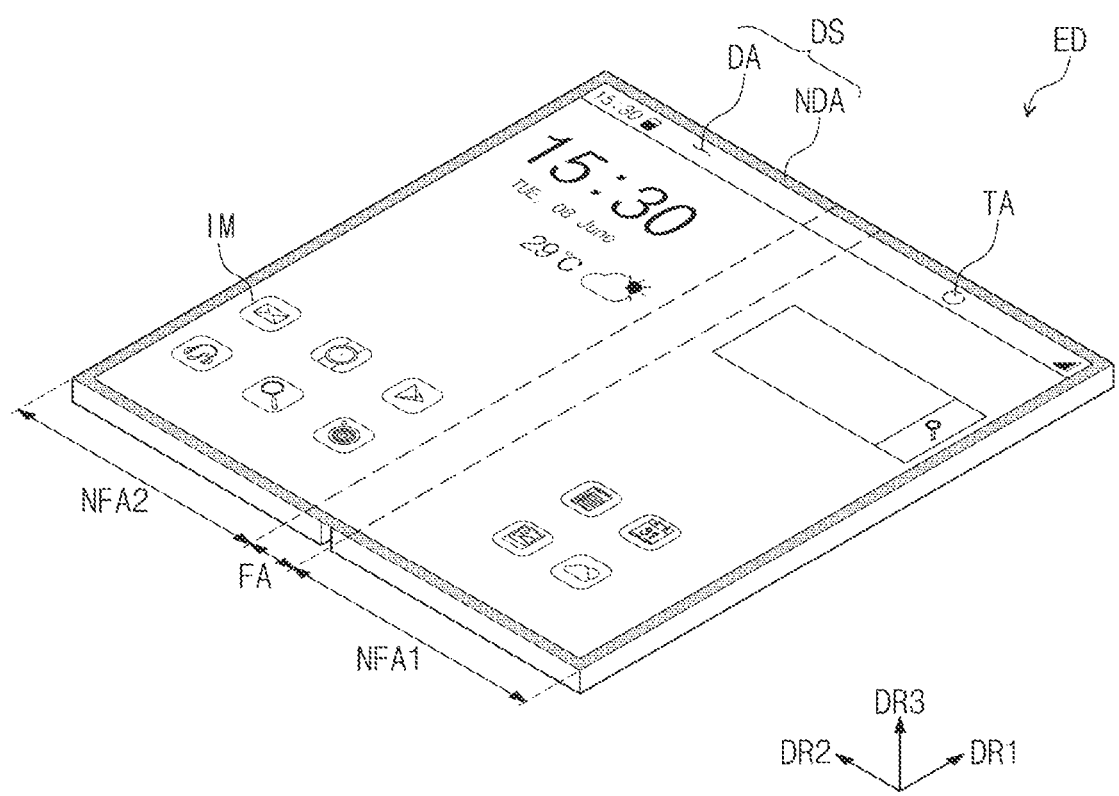
FIGS. 1A to 1C are perspective views illustrating an electronic apparatus according to an embodiment of the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or area, layer, part, portion, etc.) is "on", "connected with", or "coupled to" a second component means that the first component is directly on, connected with, or coupled to the second component or means that a third component is disposed therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the present disclosure will be described with reference to the accompanying drawings.

FIGS. TA to 1C are perspective views illustrating an electronic apparatus according to an embodiment of the present disclosure. FIG. TA illustrates the electronic apparatus in an unfolding state, and FIG. 1B illustrates the electronic apparatus in a folding state.

Referring to FIGS. TA to 1C, an electronic apparatus ED according to an embodiment of the present disclosure may include a display surface DS defined by a first direction DRT and a second direction DR2 crossing the first direction DR1. The electronic apparatus ED may provide an image IM to the user through the display surface DS.

The display surface DS may include a display region DA and a non-display region NDA around the display region DA. The display region DA may display the image IM, and the non-display region NDA may not display the image IM. The non-display region NDA may surround the display region DA. However, the present disclosure is not limited thereto, and the form of the display region DA and the form of the non-display region NDA may be deformed.

The display surface DS may include a sensing region TA. The sensing region TA may be a partial region of the display region DA. The sensing region TA has light transmittance higher than that of another region of the display region DA. Hereinafter, another region of the display region DA except for the sensing region TA may be defined as a general display region.

A light signal, for example, a visible ray or an infrared ray may move to the sensing region TA. The electronic apparatus ED may capture an external image through the visible ray passing through the sensing region TA or may determine the proximity of an external object through the infrared ray. Although FIG. TA illustrates an embodiment where a single sensing region TA is provided, the present disclosure is not limited thereto. In an alternative embodiment, a plurality of sensing regions TA may be provided.

Hereinafter, a direction substantially perpendicular to a plane defined by the first direction DR1 and the second direction DR2 is defined as a third direction DR3. The third direction DR3 may serve as a basis for distinguishing between a front surface and a rear surface of members. In the present disclosure, the wording "in a plan view" may refer to the state when viewed in the third direction DR3.

The electronic apparatus ED may include a folding region FA and a plurality of non-folding regions NFA1 and NFA2. The non-folding regions NFA1 and NFA2 may include the first non-folding region NFA1 and the second non-folding region NFA2. The first non-folding region NFA1 and the second non-folding region NFA2 may be spaced apart from each other in the second direction DR2 while interposing the folding region FA between the first non-folding region NFA1 and the second non-folding region NFA2.

In an embodiment, as illustrated in FIG. 1B, the folding region FA may be folded about a folding axis FX parallel to the first direction DR1. The folding region FA has a specific curvature and a specific radius VV of curvature. The distance between the first non-folding region NFA1 and the second non-folding region NFA2 may be substantially equal to twice of the radius VV of curvature. According to an embodiment, the electronic apparatus ED may be folded in an in-folding scheme in which the first non-folding region NFA1 and the second non-folding region NFA2 face each other and the electronic apparatus ED is not exposed to the outside.

Figure 1B:
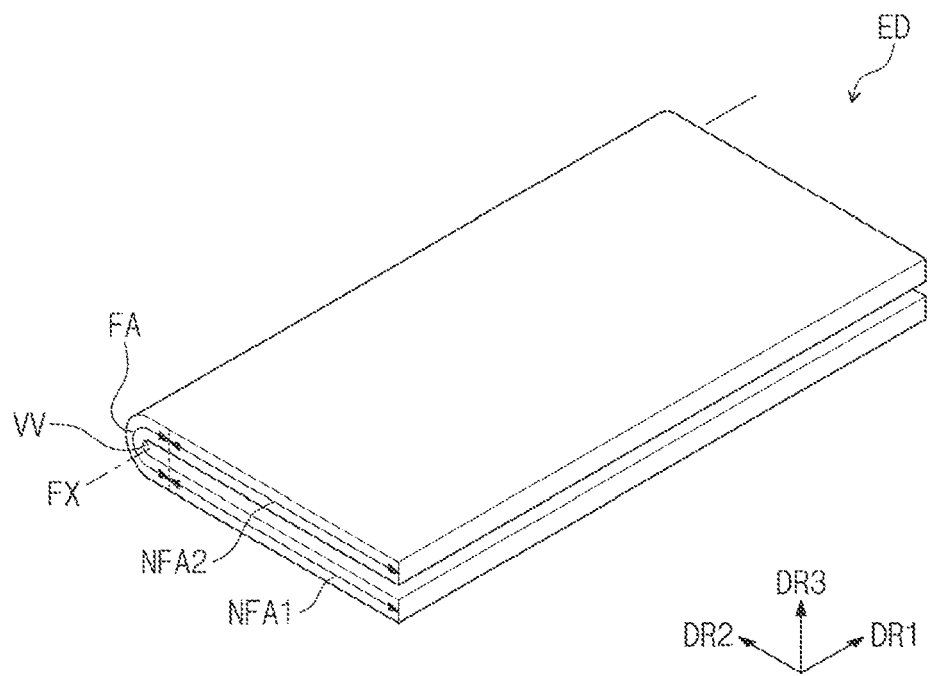
Figure 1C:
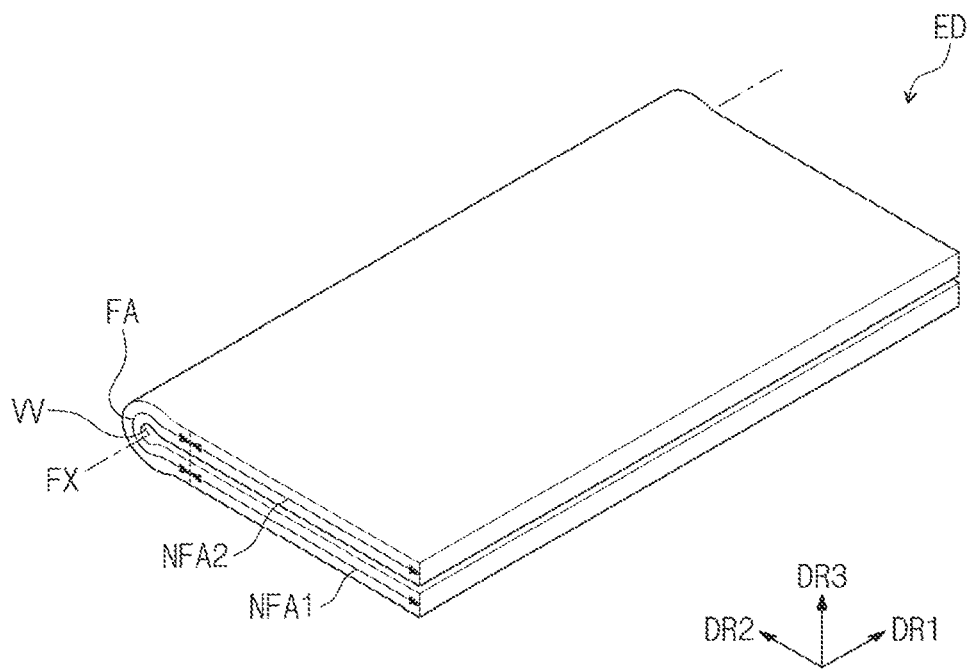

In an alternative embodiment, as illustrated in FIG. 1C, the distance between the first non-folding region NFA1 and the second non-folding region NFA2 may be less than twice of the radius VV of curvature. Accordingly, the spacing between the first non-folding region NFA1 and the second non-folding region NFA2 may be reduced in the folding state. Accordingly, when the electronic apparatus ED is folded, the slim electronic apparatus ED may be provided.

However, the present disclosure is not limited thereto. According to another alternative embodiment, the electronic apparatus ED may be in an out-folding state such that the display surface DS is exposed to the outside. According to an embodiment of the present disclosure, the electronic apparatus ED may be configured to repeat the switch from the unfolding operation to an in-folding or out-folding operation and the switch from the in-folding or out-folding operation to the unfolding operation, but the present disclosure is not limited thereto. According to an embodiment of the present disclosure, the electronic apparatus ED may be configured any one of the unfolding operation, the in-folding operation, and the out-folding operation.

Figure 2A:
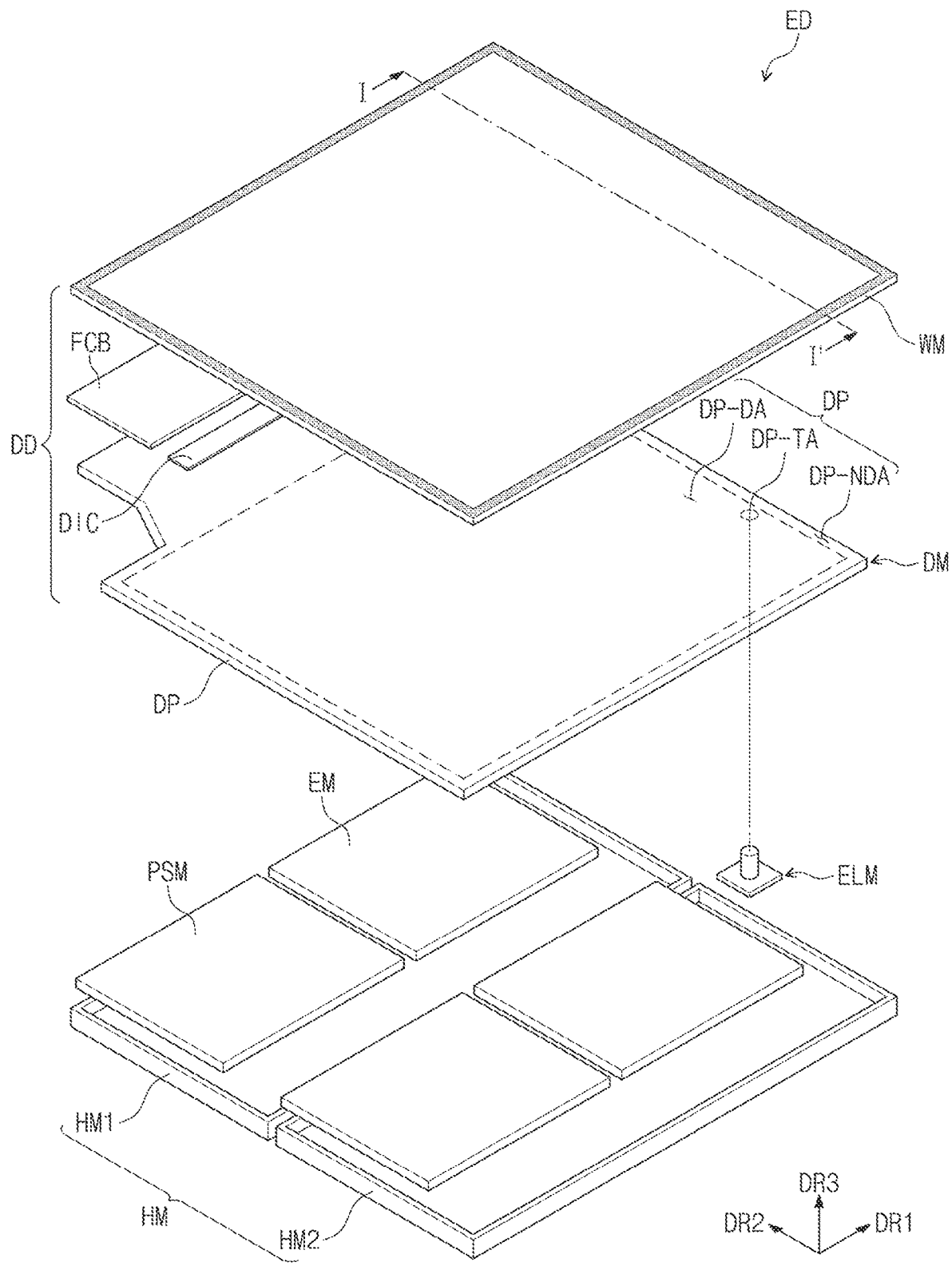
FIG. 2A is an exploded perspective view of an electronic apparatus according to an embodiment of the present disclosure.
Figure 2B:
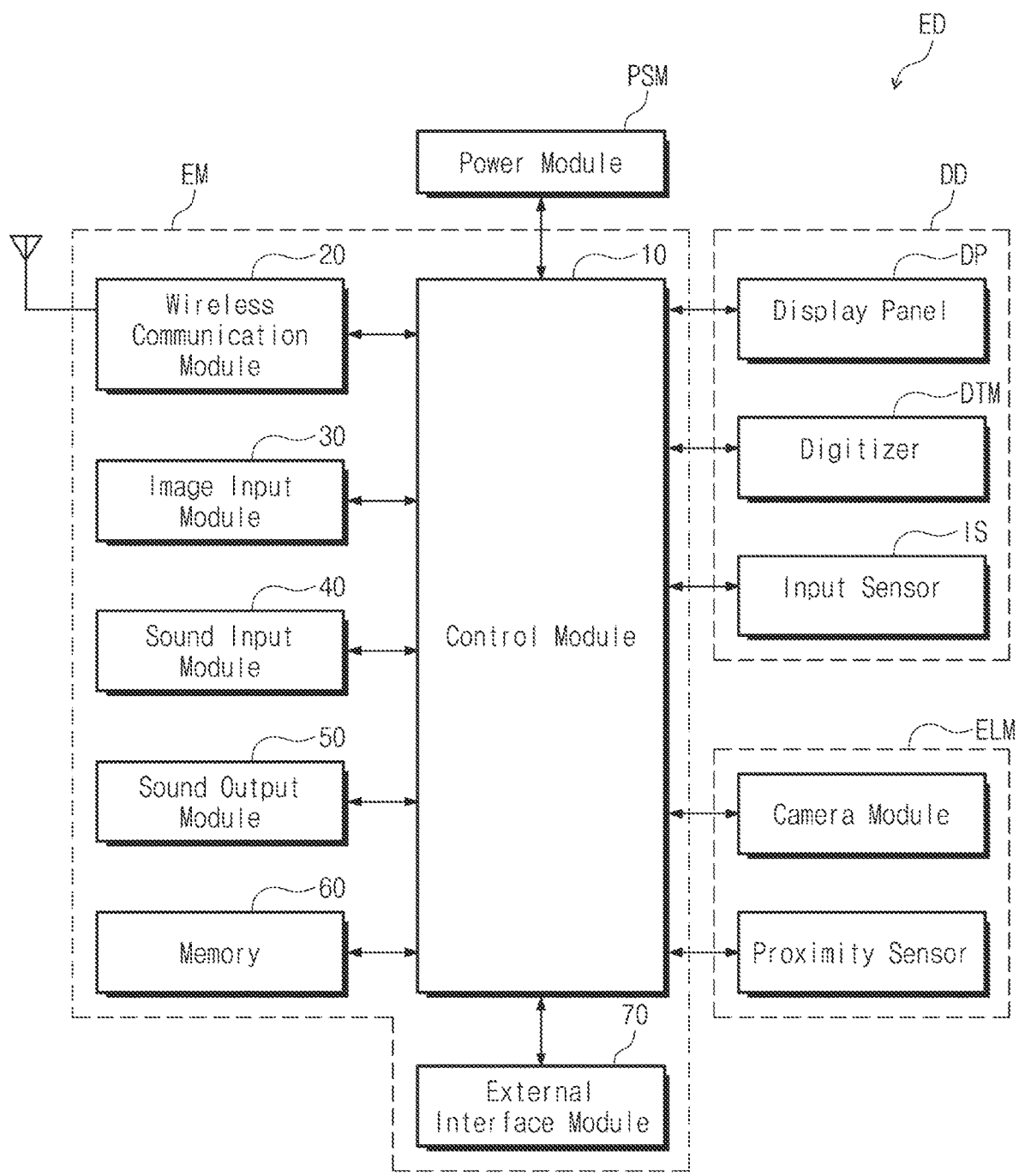
FIG. 2B is a block diagram of an electronic apparatus according to an embodiment of the present disclosure.

FIG. 2A is an exploded perspective view of an electronic apparatus according to an embodiment of the present disclosure. FIG. 2B is a block diagram illustrating an electronic apparatus according to an embodiment of the present disclosure.

Referring to FIGS. 2A and 2B, an embodiment of the electronic apparatus ED may include a display device DD, an electronic module EM, an electronic optical module ELM, a power supply module PSM, and a housing HM. Although not illustrated separately, the electronic apparatus ED may further include a mechanism to control the folding operation of the display device DD.

The display device DD generates an image and detects an external input. The display device DD may include a window WM and a display module DM. The window WM provides a front surface of the electronic apparatus ED. The window WM will be described later in greater detail. Hereinafter, the display module DM will be described in detail.

The display module DM may include a display panel DP. Although FIG. 2A illustrates only the display panel DP of a stack structure of the display module DM, the display module DM may substantially include not only the display panel DP but also a plurality of components disposed above the display panel DP. The stack structure of the display module DM will be described later in greater detail.

The type of the display panel DP is not specifically limited thereto. In an embodiment, for example, the display panel DP may be an emissive-type display panel such as an organic light emitting display panel or a quantum-dot light emitting display panel.

The display panel DP includes a display region DP-DA and a non-display region DP-NDA corresponding to the display region DA (see FIG. 1A) and the non-display region NDA (see FIG. 1A) of the electronic apparatus ED. In the present disclosure, the phrase "a region/part correspond to a region/part" refers to that the region/part overlaps the region/part", and is not limited to that the region/part has an area (size) or shape the same as an area (size) or shape of the region/part.

The display panel DP may include a sensing region DP-TA (a first region) corresponding to the sensing region TA of FIG. 1A. The sensing region TA has a region having a resolution lower than a resolution of the display region DP-DA (a second region). The sensing region DP-TA will be described later in greater detail.

In an embodiment, as illustrated in FIG. 2A, a driving chip DIC may be disposed on the non-display region DP-NDA of the display panel DP. A flexible circuit board FCB may be coupled to the non-display region DP-NDA of the display panel DP. The flexible circuit board FCB may be connected to a main circuit board. The main circuit board may be one electronic component constituting the electronic module EM.

The driving chip DIC may include a driving device to drive a pixel of the display panel DP, for example, a data driving circuit. Although FIG. 2A illustrates an embodiment where the driving chip DIC is mounted on the display panel DP, the present disclosure is not limited thereto. In an alternative embodiment, for example, the driving chip DIC may be mounted on the flexible circuit board FCB.

In an embodiment, as illustrated in FIG. 2B, the display device DD may further include an input sensor IS and a digitizer DTM. The input sensor IS senses a user input. The capacitive type of input sensor IS may be disposed above the display panel DP. The digitizer DTM detects an input of the stylus pen. An electromagnetic induction type digitizer DTM may be disposed under the display panel DP.

The electronic module EM may include a control module 10, a wireless communication module 20, an image input module 30, a sound input module 40, a sound output module 50, a memory 60, and an external interface module 70. The electronic module EM may include a main circuit board, and the modules may be mounted on the main circuit board or electrically connected to the main circuit board through a flexible circuit board. Each of the input sensor IS and the digitizer DTM may be connected to the main circuit board through a connector or the like. The electronic module EM is electrically connected to the power supply module PSM.

The electronic modules EM may be disposed in a first housing HMT and a second housing HM2, and the power supply modules PSM may be respectively disposed in the first housing HMT and the second housing HM2. Although not illustrated, the electronic module EM disposed in the first housing HMT and the electronic module EM disposed in the second housing HM2 may be electrically connected to each other through a flexible circuit board.

The control module 10 controls the overall operation of the electronic apparatus ED. In an embodiment, for example, the control module 10 activates or deactivates the display device DD in response to a user input. The control module 10 may control the image input module 30, the sound input module 40, and the sound output module 50, in response to the user input. The control module 10 may include at least one microprocessor.

The wireless communication module 20 may transmit/receive a wireless signal to/from another terminal using a Bluetooth or Wi-Fi line. The wireless communication module 20 may transmit/receive a voice signal using a general communication line. The wireless communication module 20 may include a plurality of antenna modules.

The image input module 30 processes the image signal and converts the image signal into image data that may be displayed on the display device DD. The sound input module 40 receives an external sound signal through a microphone in a recording mode, or a voice recognition mode, and transforms the external sound signal into electrical voice data. The sound output module 50 converts audio data received from the wireless communication module 20 or audio data stored in the memory 60 and then outputs the converted data to the outside.

The external interface module 70 serves as an interface connected to an external charger, a wired/wireless data port, a card socket (e.g., a memory card or an SIM/UIM card).

The power supply module PSM supplies a power used for the overall operation of the electronic apparatus ED. The power supply module PSM may include a general battery device.

The electronic optical module ELM may be an electronic part transmitting or receiving an optical signal. The electronic optical module ELM may include a camera module and/or a proximity sensor. The camera module may capture an external image through the sensing region DP-TA. The electronic optical module ELM may be disposed at a lower portion of the display device and may overlap the sensing region DP-TA.

The housing HM is coupled to the window WM to receive other modules described above. Although FIG. 2A illustrate an embodiment where the housing HM includes the first and second housings HMT and HM2 separate from each other, the present disclosure is not limited thereto. According to an embodiment, the electronic apparatus ED may further include a hinge structure to connect the first and second housings HMT and HM2 to each other.

Figure 3A:
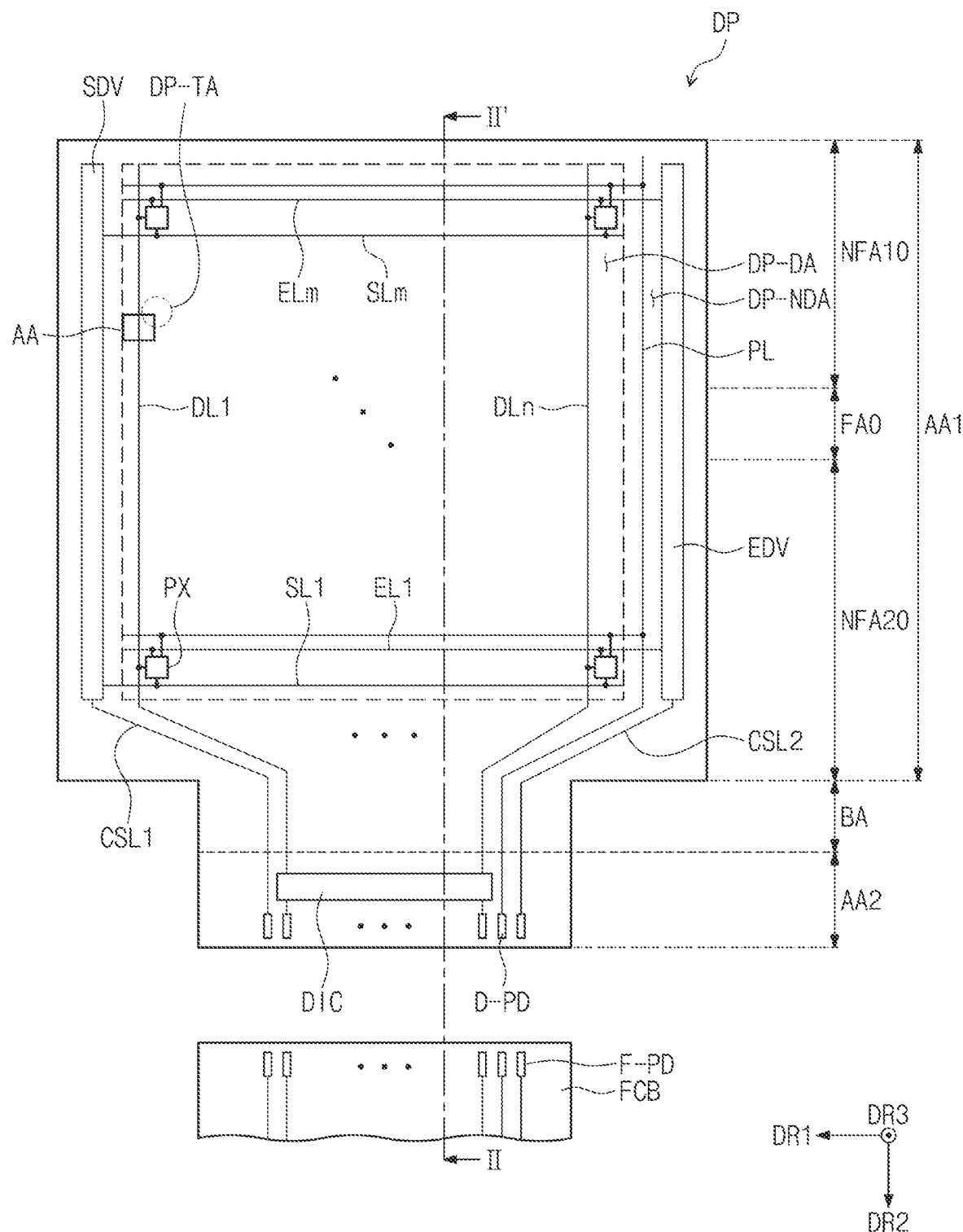
FIG. 3A is a plan view of a display panel, according to an embodiment of the present disclosure.
Figure 3B:
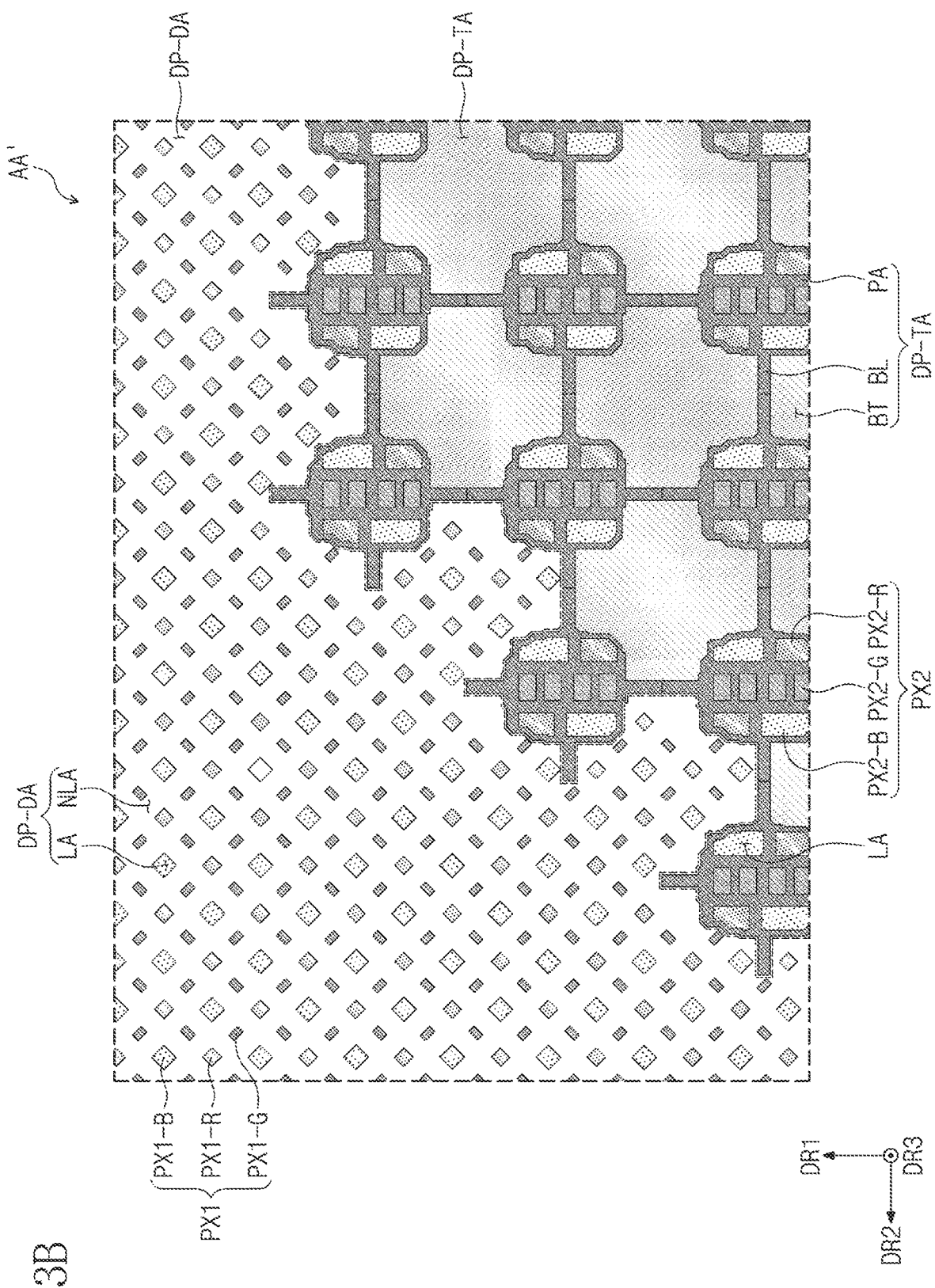
FIG. 3B is an enlarged plan view illustrating a partial region AA of FIG. 3A.

FIG. 3A is a plan view of the display panel DP according to an embodiment of the present disclosure. FIG. 3B is an enlarged plan view illustrating a partial region AA of FIG. 3A.

Referring to FIG. 3A, an embodiment of the display panel DP may include the display region DP-DA and the non-display region DP-NDA disposed around the display region DP-DA. The display region DP-DA and the non-display region DP-NDA are distinguished depending on (or defined based on) the presence of a pixel PX. The pixel PX is disposed in the display region DP-DA. A scan driver SDV, a data driver, and alight emitting driver EDV may be disposed in the non-display region DP-NDA. The data driver may be a partial circuit included in the driving chip DIC illustrated in FIG. 3A.

The display panel DP includes a first non-bending region AAT, a second non-bending region AA2, and a bending region BA divided in the second direction DR2. The second non-bending region AA2 and the bending region BA may be a partial region of the non-display region DP-NDA. The bending region BA is interposed between the first non-bending region AA1 and the second non-bending region AA2.

The first non-bending region AA1 may be a region corresponding to the display surface DS of FIG. TA. The first non-bending region AA1 may include a first non-folding region NFA10, a second non-folding region NFA20, and a folding region FA0. The first non-folding region NFA10, the second non-folding region NFA20, and the folding region FA0 correspond to the first non-folding region NFA1, the second non-folding region NFA2, and the folding region FA of FIGS. TA to 1C.

The length of the bending region BA and the second non-bending region AA2 in the first direction DR1 may be less than the length of the first non-bending region AA1. The bending region BA having the shorter length in the first direction DR1 may be easily bent about the bending axis extending in the first direction DR1.

The display panel DP may include a plurality of pixels PX, a plurality of scan lines SL1-SLm, a plurality of data lines DL1-DLn, a plurality of light emitting lines EL1-ELm, first and second control lines CSL1 and CSL2, a power line PL, and a plurality of pads D-PD. Here, "m" and "n" are natural numbers. The pixels PX may be connected with the scan lines SL1-SLm, the data lines DL1-DLn, and the light emitting lines EL1-ELm.

The scan lines SL1-SLm may extend in the first direction DR1 and may be electrically connected with the scan driver SDV. The data lines DL1-DLn may extend in the second direction DR2 and may be electrically connected with the driving chip DIC through the bending region BA. The light emitting lines EL1-ELm may extend in the first direction DR1 and may be electrically connected with the light emitting driver EDV.

The power line PL may include a portion extending in the second direction DR2 and a portion extending in the first direction DR1. The portion extending in the first direction DR1 and the portion extending in the second direction DR2 may be disposed in mutually different layers. The portion, which extends in the second direction DR2, of the power line PL may extend to the second non-bending region AA2 via the bending region BA. The power line PL may provide a first voltage to the pixels PX.

The first control line CSL1 may be connected to the scan driver SDV and may extend toward a lower end of the second non-bending region AA2 via the bending region BA. The second control line CSL2 may be connected to the light emitting driver EDV and may extend toward the lower end of the second non-bending region AA2 via the bending region BA.

When viewed in a plan view or in the third direction DR3, the display pads D-PD may be disposed to be adjacent to a lower portion of the second non-bending region AA2. The driving chip DIC, the power line PL, the first control line CSL1, and the second control line CSL2 may be electrically connected to the pads D-PD. Substrate pads F-PD included in the flexible circuit board FCB may be electrically connected to the relevant display pads D-PD through an anisotropic conductive adhesive layer Referring to FIG. 3B, the sensing region DP-TA (a first region) has a region having a higher light transmittance and a lower resolution than the light transmittance and the resolution of the display region DP-DA (a second region). The light transmittance and the resolution are measured within a reference area (or a unit area). The occupation proportion of the light shielding structure in the reference area of the sensing region DP-TA is less than the occupation proportion of the light shielding structure in the reference area of the display region DP-DA. The light shielding structure may include the conductive pattern of the circuit layer, the electrode of the light emitting device, and the light shielding pattern to be described below.

The sensing region DP-TA has a resolution lower than the resolution of the display region DP-DA, based on a reference area. The number of pixels in the sensing region DP-TA is less than the number of pixels in the display region DP-DA, based on the reference area (or based on a same unit area, e.g., per square inch).

In an embodiment, as illustrated in FIG. 3B, the first pixel PX1 may be disposed in the display region DP-DA and the second pixel PX2 may be disposed in the sensing region DP-TA. The first pixel PX1 and the second pixel PX2 may have mutually different areas, when compared to each other based on the area of the pixel providing a same color. The first pixel PX1 and the second pixel PX2 may have mutually different arrangements.

FIG. 3B illustrates light emitting regions LA of the first pixel PX1 and the second pixel PX2, as representatives of the first pixel PX1 and the second pixel PX2. Each of the light emitting regions LA may be defined as a region in which an anode of the light emitting device is exposed from a pixel defining layer. A non-light emitting region NLA is interposed between the light emitting regions LA in the display region DP-DA.

The first pixel PX1 may include a first color pixel PX1-R, a second color pixel PX1-G, and a third color pixel PX1-B, and the second pixel PX2 may include a first color pixel PX2-R, a second color pixel PX2-G, and a third color pixel PX2-B. The first color pixel PX1-R and the first color pixel PX2-R may provide (or emit) red light, the second color pixel PX1-G and the second color pixel PX2-G may provide green light, and the third color pixel PX1-B and the third color pixel PX2-B may provide blue light.

The sensing region DP-TA may include a pixel region PA, a wiring region BL, and a transmissive region BT. The second pixel PX2 is disposed in the pixel region PA. Two first color pixels PX2-R, four second color pixels PX2-G, and two third color pixels PX2-B are disposed in one pixel region PA, but the present disclosure is not limited thereto.

A conductive pattern, a signal line, or a light blocking pattern related to the second pixel PX2 is disposed in the pixel region PA and the wiring region BL. The light blocking pattern may be a metal pattern, and may substantially overlap the pixel region PA and the wiring region BL. The pixel region PA and the wiring region BL may be non-transmissive regions.

The transmissive region BT is a region through which the optical signal substantially passes. Since the second pixel PX2 is not disposed in the transmissive region BT, a conductive pattern, a signal line, or a light blocking pattern is disposed in the transmissive region BT. Accordingly, the transmissive region BT increases the light transmittance of the sensing region DP-TA. According to an embodiment, the electronic optical module ELM described in FIG. 2A may improve optical signal reception efficiency, as the electronic optical module ELM overlap the sensing region DP-TA having higher light transmittance.

Figure 4:
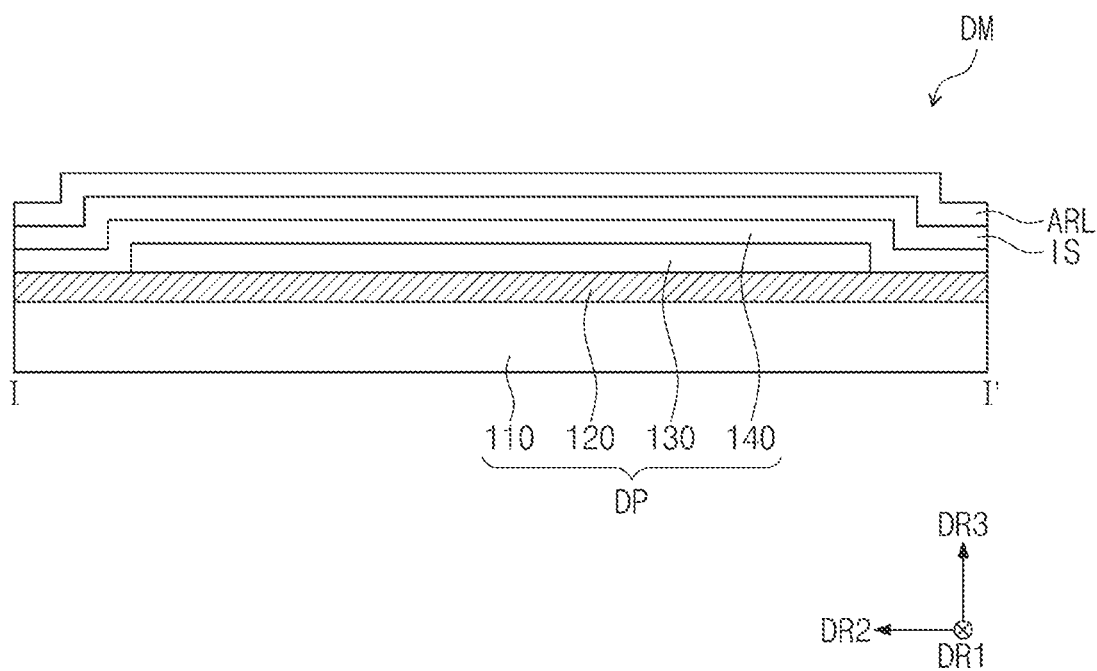
FIG. 4 is a cross-sectional view taken along line I-I' of FIG. 2A.

FIG. 4 is a cross-sectional view taken along lien I-I' of FIG. 2A.

Referring to FIG. 4, an embodiment of the display module DM may include the display panel DP, the input sensor IS, and an anti-reflective layer ARL. The display panel DP may include a base layer 110, a circuit layer 120, a light emitting device layer 130, and an encapsulation layer 140.

The base layer 110 may provide a base surface on which the circuit layer 120 is disposed. The base layer 110 may be a flexible substrate allowing bending, folding, or rolling. The base layer 110 may be a glass substrate, a metal substrate, or a polymer substrate. However, the embodiment of the present disclosure is not limited thereto, and the base layer 110 may be an inorganic layer, an organic layer, or a composite material layer.

The base layer 110 may have a multi-layer structure. In an embodiment, for example, the base layer 110 may include a first synthetic resin layer, a multilayer or single-layer inorganic layer, and a second synthetic resin layer disposed on the multilayer or single-layer inorganic layer. Each of the first and second synthetic resin layers may include a polyimide-based resin, but the present disclosure is not particularly limited thereto.

The circuit layer 120 may be disposed on the base layer 110. The circuit layer 120 may include an insulating layer, a semiconductor pattern, a conductive pattern, a signal line, or the like.

The light emitting device layer 130 may be disposed on the circuit layer 120. The light emitting device layer 130 may include a light emitting device. In an embodiment, for example, the light emitting device may include an organic light emitting material, an inorganic light emitting material, an organic-inorganic light emitting material, a quantum dot, a quantum rod, a micro-light emitting diode (LED), or a nano-LED.

The encapsulation layer 140 may be disposed on the light emitting device layer 130. The encapsulation layer 140 may protect the light emitting device layer 130 from foreign substances such as moisture, oxygen, and dust particles. The encapsulation layer 140 may include at least one inorganic layer. The encapsulation layer 140 may have a stack structure of an inorganic layer/organic layer/inorganic layer.

The input sensor IS may be directly disposed on the display panel DP. The display panel DP and the input sensor IS may be formed through a subsequent process. In this case, the phrase "~being directly disposed" may indicate that a third component is not intervened between the input sensor IS and the display panel DP. In other words, a separate adhesive layer is not interposed between the input sensor IS and the display panel DP.

The anti-reflective layer ARL may be directly disposed on the input sensor IS. The anti-reflective layer ARL may reduce reflectance of external light incident from the outside of the display device DD (see FIG. 1). The anti-reflective layer ARL may include color filters. The color filters may have a specific array. In an embodiment, for example, the color filters may be arranged based on light emitting colors of pixels included in the display panel DP. In addition, the anti-reflective layer ARL may further include a black matrix adjacent to the color filters.

According to an embodiment, the position of the input sensor IS and the position of the anti-reflective layer ARL may be exchanged. According to an embodiment of the present disclosure, the anti-reflective layer ARL may be replaced with a polarization film. In such an embodiment, the polarization film may be coupled to the input sensor IS through an adhesive layer.

Figure 5A:
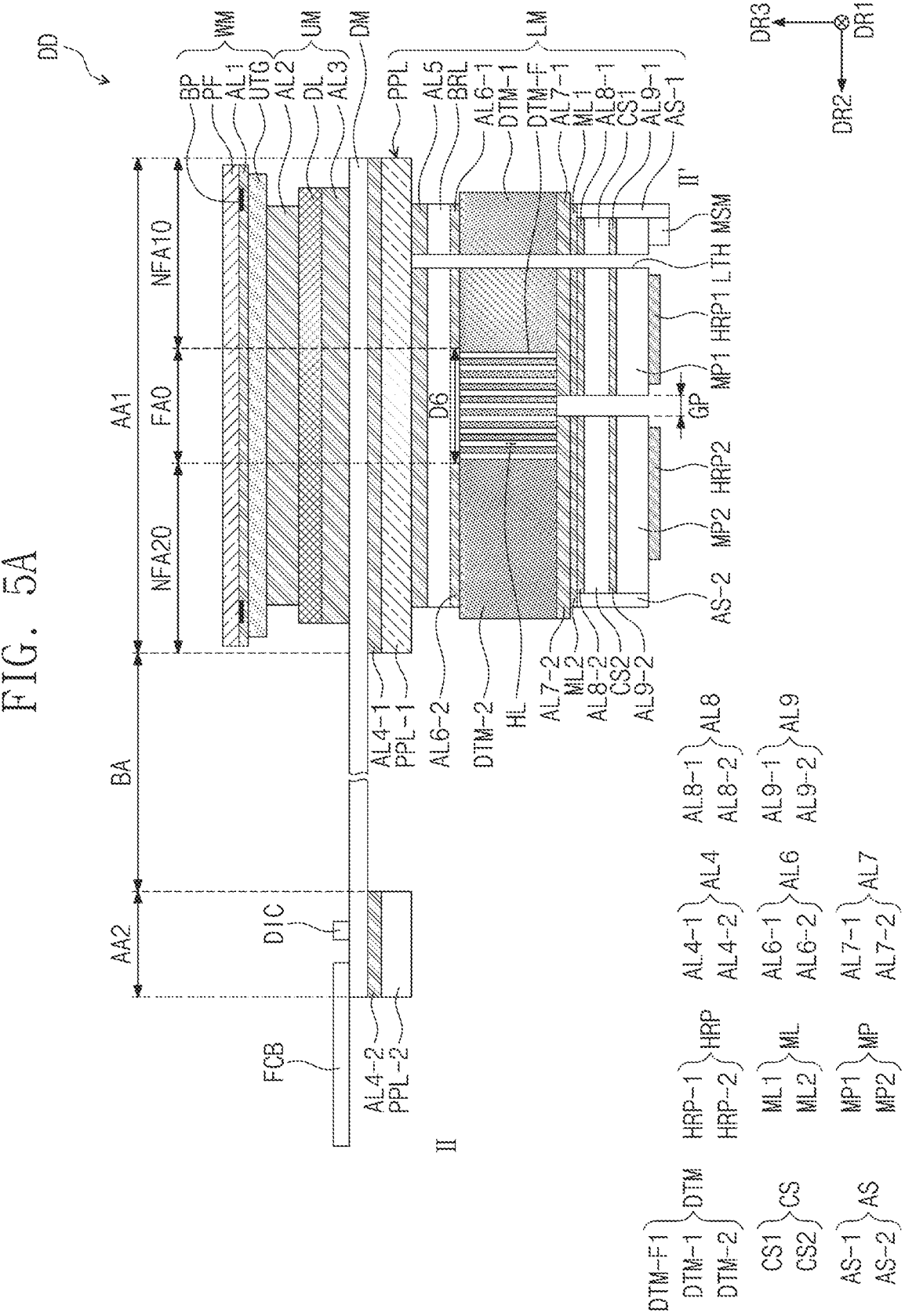
FIG. 5A is a cross-sectional view taken along line II-II' of FIG. 3A.
Figure 5B:
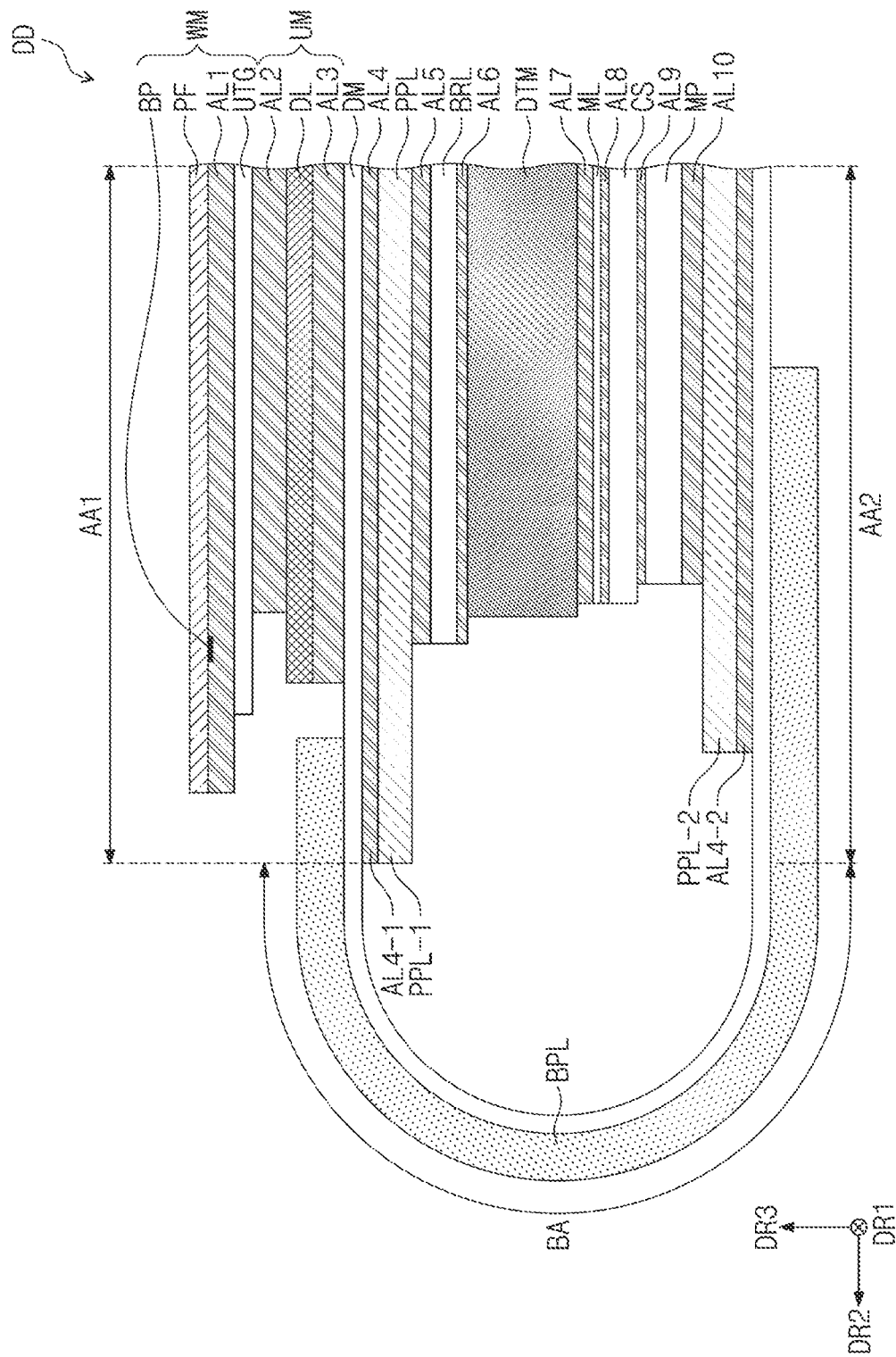
FIG. 5B is a cross-sectional view of a display device which is bent according to an embodiment of the present disclosure.

FIG. 5A is a cross-sectional view taken along line II-II' of FIG. 3A. FIG. 5B is a cross-sectional view of a display device which is bent according to an embodiment of the present disclosure. FIG. 5A illustrates the display device DD in an unfolding state in which the display module DM is not bent. FIG. 5B illustrates the display device DD in a state in which the bending region BA of the display module DM is bent.

Referring to FIGS. 5A and 5B, the display device DD includes the window WM, an upper member UM, the display module DM, and a lower member LM. The upper member UM collectively refers to a component interposed between the window WM and the display module DM, and the lower member LM collectively refers to a component disposed below the display module DM.

The window WM may include a thin film glass substrate UTG, a window protecting layer PF disposed on the thin film glass substrate UTG, and a bezel pattern BP disposed on a bottom surface of the window protecting layer PF. According to an embodiment, the window protecting layer PF may include a synthetic resin film.

The bezel pattern BP may be disposed on one surface of the thin film glass substrate UTG or one surface of the window protecting layer PF. FIG. 5A illustrates an embodiment where the bezel pattern BP is disposed on the bottom surface of the window protecting layer PF by way of example. However, the present disclosure is not limited thereto, and the bezel pattern BP may be disposed on a top surface of the window protecting layer PF. The bezel pattern BP, which includes a colored light blocking film, may be formed, for example, through a coating manner. The bezel pattern BP may include a base material and a dye or pigment mixed with the base material. The non-display region NDA illustrated in FIG. 1A may be defined by the shape of the bezel pattern BP.

The thickness of the thin film glass substrate UTG may be in a range of about 15 micrometers (μm) to about 45 μm. The thin film glass substrate UTG may be chemically reinforced glass. The thin film glass substrate UTG may minimize the occurrence of wrinkles even if folding and unfolding are repeated.

The thickness of the window protecting layer PF may be in a range of about 50 m to about 80 m. The synthetic resin film of the window protecting layer PF may include polyimide, polycarbonate, polyamide, triacetylcellulose, polymethylmethacrylate, or polyethylene terephthalate. Although not illustrated separately, at least one selected from a hard coating layer, an anti-fingerprint layer, and an anti-reflection layer may be further disposed on an upper surface of the window protecting layer PF.

The window protecting layer PF and the thin film glass substrate UTG may be coupled to each other by a first adhesive layer AL1. The first adhesive layer AL1 may be a pressure sensitive adhesive film (PSA) or an optically clear adhesive member (OCA). Adhesive layers to be described below may also include a same adhesive as the first adhesive layer AL1.

In an embodiment, the first adhesive layer AL1 may be separated from the thin film glass substrate UTG. In such an embodiment, adhesive force between the first adhesive layer AL1 and the thin film glass substrate UTG may be less than adhesive force between the first adhesive layer AL1 and the window protecting layer PF. As the window protecting layer PF is disposed at an upper portion of the thin film glass substrate UTG, the window protecting layer PF may be more easily scratched. After separating the first adhesive layer AL1 and the window protecting layer PF, a new window protecting layer PF may be attached to the thin film glass substrate UTG.

When viewed in a plan view, the edge of the thin film glass substrate UTG may be in the non-overlap state with the bezel pattern BP. As the above-described condition is satisfied, the edge of the thin film glass substrate UTG is exposed from the bezel pattern BP, and the fine crack in the edge of the thin film glass substrate UTG may be inspected by an inspecting device.

The upper member UM includes an upper film DL. The upper film DL may include a synthetic resin film. The synthetic resin film may include polyimide, polycarbonate, polyamide, triacetylcellulose, polymethylmethacrylate, or polyethylene terephthalate.

The upper film DL may absorb an external impact applied to the front surface of the display device DD. The display module DM described with reference to FIG. 4 may include an anti-reflective layer ARL instead of the polarizing film, which may reduce the front impact strength of the display device DD. The upper film DL may compensate for the reduced impact strength by applying the anti-reflective layer ARL. According to an embodiment of the present disclosure, the upper film DL may be omitted. The thin film glass substrate UTG and the upper film DL may be coupled to each other by a second adhesive layer AL2. The upper film DL and the display module DM may be coupled to each other by a third adhesive layer AL3.

The lower member LM may include a panel protecting layer PPL, a barrier layer BRL, the digitizer DTM, a metal layer ML, a cushion layer CS, a metal plate MP, a heat dissipation layer HRP, a magnetic suppressing sheet MSM, and a step compensating member AS. Components of the lower member LM except for the digitizer DTM may be defined as a functional layer.

The panel protecting layer PPL may be disposed under the display module DM. The panel protecting layer PPL may protect a lower portion of the display module DM. The panel protecting layer PPL may include a flexible synthetic resin film. In an embodiment, for example, the panel protecting layer PPL may include polyethylene terephthalate.

According to an embodiment, the panel protecting layer PPL may be absent in the bending region BA. The panel protecting layer PPL may include a first panel protecting layer PPL-1 to protect the first non-bending region AA1 of the display panel DP (see FIG. 3A) and a second panel protecting layer PPL-2 to protect the second non-bending region AA2.

A fourth adhesive layer AL4 bonds the panel protecting layer PPL with the display module DM. The fourth adhesive layer AL4 may include a first part AL4-1 corresponding to the first panel protecting layer PPL-1 and a second part AL4-2 corresponding to the second panel protecting layer PPL-2.

In an embodiment, as illustrated in FIG. 5B, in a state where the bending region BA is bent, the second panel protecting layer PPL-2 may be disposed together with the second non-bending region AA2, under the first non-bending region AA1 and the first panel protecting layer PPL-1. Since the panel protecting layer PPL is not disposed in the bending region BA, the bending region BA may be more easily bent. The second panel protecting layer PPL-2 may be attached to the metal plate MP through a tenth adhesive layer AL10. The tenth adhesive layer AL10 may be omitted. Although not illustrated separately, an additional component, such as an insulating tape, may be further disposed between the second panel protecting layer PPL-2 and the metal plate MP.

In an embodiment, as illustrated in FIG. 5B, the bending region BA has a specific curvature and a specific radius of curvature. The specific radius of curvature may be in a range of about 0.1 millimeter (mm) to about 0.5 mm. A bending protecting layer BPL is disposed at least in the bending region BA. The bending protecting layer BPL may overlap the bending region BA, the first non-bending region AA1, and the second non-bending region AA2. The bending protecting layer BPL may be disposed on the entire region of the bending region BA, and may be disposed on a portion of the first non-bending region AA1 and a portion of the second non-bending region AA2.

The bending protecting layer BPL may be bent together with the bending region BA. The bending protecting layer BPL protects the bending region BA from external impact and controls a neutral surface of the bending region BA. The bending protecting layer BPL controls the stress of the bending region BA such that the neutral surface approaches the signal lines disposed in the bending region BA.

The barrier layer BRL may be disposed under the panel protecting layer PPL. The barrier layer BRL and the panel protecting layer PPL may be coupled to each other through a fifth adhesive layer AL5.

The barrier layer BRL may increase resistance force against compressive force resulting from external pressing. Accordingly, the barrier layer BRL may effectively prevent the display panel DP from being deformed. The barrier layer BRL may include a flexible plastic material such as polyimide or polyethylene terephthalate. In addition, the barrier layer BRL may be a colored film having a lower light transmittance. The barrier layer BRL may absorb light incident from the outside. In an embodiment, for example, the barrier layer BRL may be a black synthetic resin film. When the display device DD is viewed from the top of the window protecting layer PF, components disposed under the barrier layer BRL may not be visible, i.e., viewed by the user.

A sixth adhesive layer AL6 combines the barrier layer BRL with the digitizer DTM. The sixth adhesive layer AL6 may include a first portion AL6-1 and a second portion AL6-2 spaced apart from each other. A distance D6 (or a spacing) between the first portion AL6-1 and the second portion AL6-2 corresponds to the width of the folding region FAO and is greater than a gap GP to be described later. The distance D6 between the first portion AL6-1 and the second portion AL6-2 may be in a range of about 5 mm to about 15 mm.

According to the present embodiment, the first portion AL6-1 and the second portion AL6-2 are defined as different portions of one adhesive layer, but the present disclosure is not limited thereto. When the first portion AL6-1 is defined as one adhesive layer (e.g., a first adhesive layer or a second adhesive layer), the second portion AL6-2 may be defined as another adhesive layer (e.g., a second adhesive layer or a third adhesive layer). The above-described definitions may be applied to the adhesive layers including two portions of the adhesive layers to be described below, as well as the sixth adhesive layer AL6.

The digitizer DTM according to an embodiment of the present disclosure may detect an input by an electromagnetic pen. In such an embodiment, the digitizer DTM may detect an input by an electromagnetic pen by using electromagnetic resonance (EMR) by electromagnetic induction.

The digitizer DTM may include a first non-folding part DTM-1 overlapping the first non-folding region NFA10, a folding part DTM-F overlapping the folding region FAO, and a second non-folding part DTM-2 overlapping the second non-folding region NFA20. According to an embodiment, holes HL are defined or formed through the folding part DTM-F in the third direction DR3, which is a thickness direction and defined in the folding part DTM-F. In the digitizer DTM, as the holes HL are defined in the folding part DTM-F, the shape of the digitizer DTM may be easily changed, when the electronic apparatus ED is folded. Components included in the digitizer DTM will be described later.

The metal layer ML may be disposed under the digitizer DTM. The metal layer ML may include a first metal layer MLT and a second metal layer ML2 overlapping a first non-folding part DTM-1 and a second non-folding part DTM-2, respectively. The first metal layer MLT and the second metal layer ML2 may overlap a portion of the folding part DTM-F, and may be spaced apart from each other in an overlap region with the folding part DTM-F.

The metal layer ML may dissipate heat, which is emitted when the digitizer DTM is driven, to the outside. The metal layer ML transfers heat, which is emitted from the digitizer DTM, downward. The metal layer ML may have electrical conductivity and thermal conductivity greater than the electrical conductivity and the thermal conductivity of the metal plate MP to be described later. The metal layer ML may include copper (Cu) or aluminum (Al). The metal layer ML having higher electrical conductivity may effectively prevent an electromagnetic wave which is generated from the electronic module EM (see FIG. 2A) disposed at the lower portion thereof and serves as noise, from exerting an influence on the digitizer DTM.

A seventh adhesive layer AL7 may combine the digitizer DTM with the metal layer ML. The seventh adhesive layer AL7 may include a first portion AL7-1 and a second portion AL7-2 corresponding to the first metal layer MLT and the second metal layer ML2, respectively.

The cushion layer CS may include a first cushion layer CS1 and a second cushion layer CS2 overlapping the first non-folding part DTM-1 and the second folding part DTM-2, respectively. The first cushion layer CS1 and the second cushion layer CS2 may overlap a portion of the folding part DTM-F, and may be spaced apart from each other with a region (or space) overlapping the folding part DTM-F therebetween.

The first cushion layer CS1 and the second cushion layer CS2 may prevent foreign substances from flowing into the holes HL when the display device DD is folded. In addition, even if the folding part DTM-F is folded with a specific curvature when the display device DD is folded, the shape of the digitizer DTM may be easily changed, as the first cushion layer CS1 and the second cushion layer CS2 are spaced apart from each other in the region overlapping the folding part DTM-F therebetween.

The cushion layer CS may be disposed under the metal layer ML. The cushion layer CS may protect the display module DM from an impact transmitted from a lower portion of the display module DM. The cushion layer CS may include foam or sponge. The foam may include polyurethane foam or thermoplastic polyurethane foam. In an embodiment where the cushion layer CS includes a foam, a barrier film serving as a base layer may be added to the cushion layer CS. The cushion layer CS may be formed by foaming a foaming agent on the barrier film.

An eighth adhesive layer AL8 may combine the metal layer ML with the cushion layer CS. The eighth adhesive layer AL8 may include a first portion AL8-1 and a second portion AL8-2 corresponding to the first metal layer CS1 and the second metal layer CS2, respectively.

The metal plate MP may be disposed under the cushion layer CS. The metal plate MP may include a first metal plate MP1 and a second metal plate MP2 overlapping the first cushion layer CS1 and the second cushion layer CS2, respectively. The metal plate MP may absorb an external impact applied from the lower portion. The metal plate MP may have the strength and the thickness greater than the strength and the thickness of the metal layer ML. The metal plate MP may include a metal material such as stainless steel.

A ninth adhesive layer AL9 combines the cushion layer CS with the metal plate MP. The ninth adhesive layer AL9 may include a first portion AL9-1 and a second portion AL9-2 corresponding to the first metal plate MP1 and the second metal plate MP2, respectively.

The heat dissipation layer HRP may be disposed under the metal plate MP. The heat dissipation layer HRP may include a first portion HRP1 and a second portion HRP2 corresponding to the first metal plate MP1 and the second metal plate MP2, respectively. The heat dissipation layer HRP emits or dissipates heat generated from electronic components disposed at the lower side. The electronic components may be the electronic modules EM illustrated in FIGS. 2A and 2B. The heat dissipation layer HRP may have a structure in which an adhesive layer and a graphite layer are alternately stacked. The heat dissipation layer HRP may be attached to the metal plate MP through an additional adhesive layer interposed between the heat dissipation layer HRP and the metal plate MP.

The magnetic suppressing sheet MSM is disposed under the metal plate MP. The magnetic suppressing sheet MSM suppresses a magnetic field generated from a magnetic substance (not illustrated) disposed at a lower side. The magnetic suppressing sheet MSM may effectively prevent a magnetic field, which is generated from the magnetic substance, from interfering with the digitizer DTM.

The magnetic suppressing sheet MSM includes a plurality of portions. At least some of the plurality of portions may have different thicknesses from one another. The plurality of portions may be disposed to correspond to a step difference of a bracket (not illustrated) disposed under the display device DD. The magnetic suppressing sheet MSM may have a structure in which a magnetic field suppressing layer and an adhesive layer are alternately stacked. A portion of the magnetic suppressing sheet MSM may be directly attached to the metal plate MP.

The step compensating member AS is coupled to the lower portion of the seventh adhesive layer A17. The step compensating member AS may be a double-sided tape or an insulating film. The step compensating member AS may include a first step compensating member AS-1 and a second step compensating member AS-2, thereby compensating for the difference of steps formed with different widths between components included in the lower member LM.

Functional layers disposed under the first non-folding part DTM-1 and the second non-folding part DTM-2 of the lower member LM are disposed to be spaced apart from each other with the specific gap GP in the region overlapping the folding part DTM-F. The gap GP may be in a range of about 0.3 mm to about 3 mm.

A through hole LTH may be defined or formed through some members of the lower member LM. The through hole LTH is defined to overlap the sensing region DP-TA of FIG. 2A. In an embodiment, as illustrated in FIG. 5A, the through hole LTH may be formed through a portion from the fifth adhesive layer AL5 to the metal plate MP. The through hole LTH is the same as a member formed by removing the light blocking structure from the path of the optical signal, thereby improving the optical signal reception efficiency of the electronic optical module ELM.

According to an embodiment, at least one selected from the metal layer ML, the cushion layer CS, the metal plate MP, and the step compensating member AS may be omitted from the electronic apparatus ED, but the present disclosure is not limited to any one embodiment.

Figure 6A:
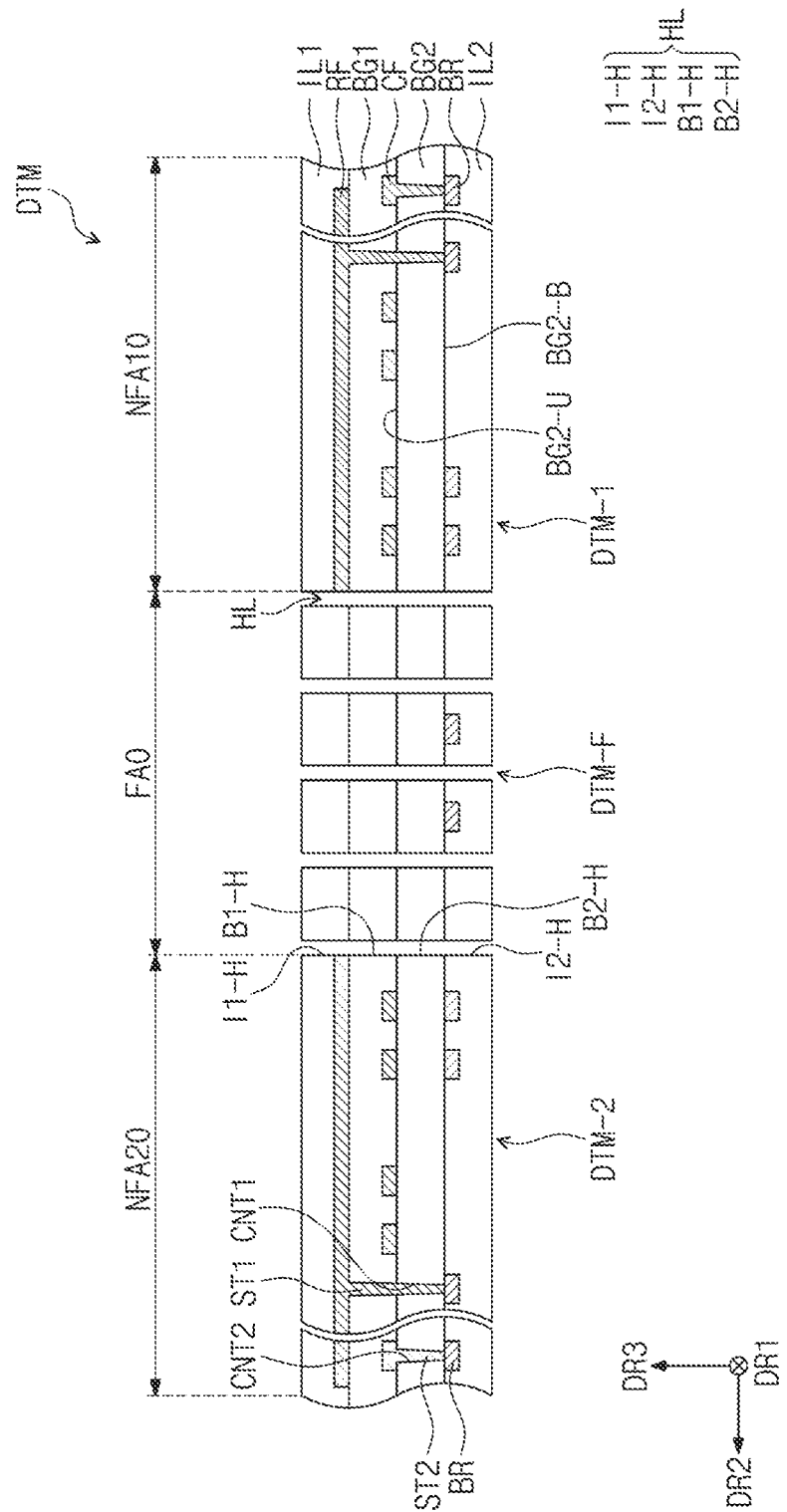
FIG. 6A is a cross-sectional view of a digitizer according to an embodiment of the present disclosure.
Figure 6B:
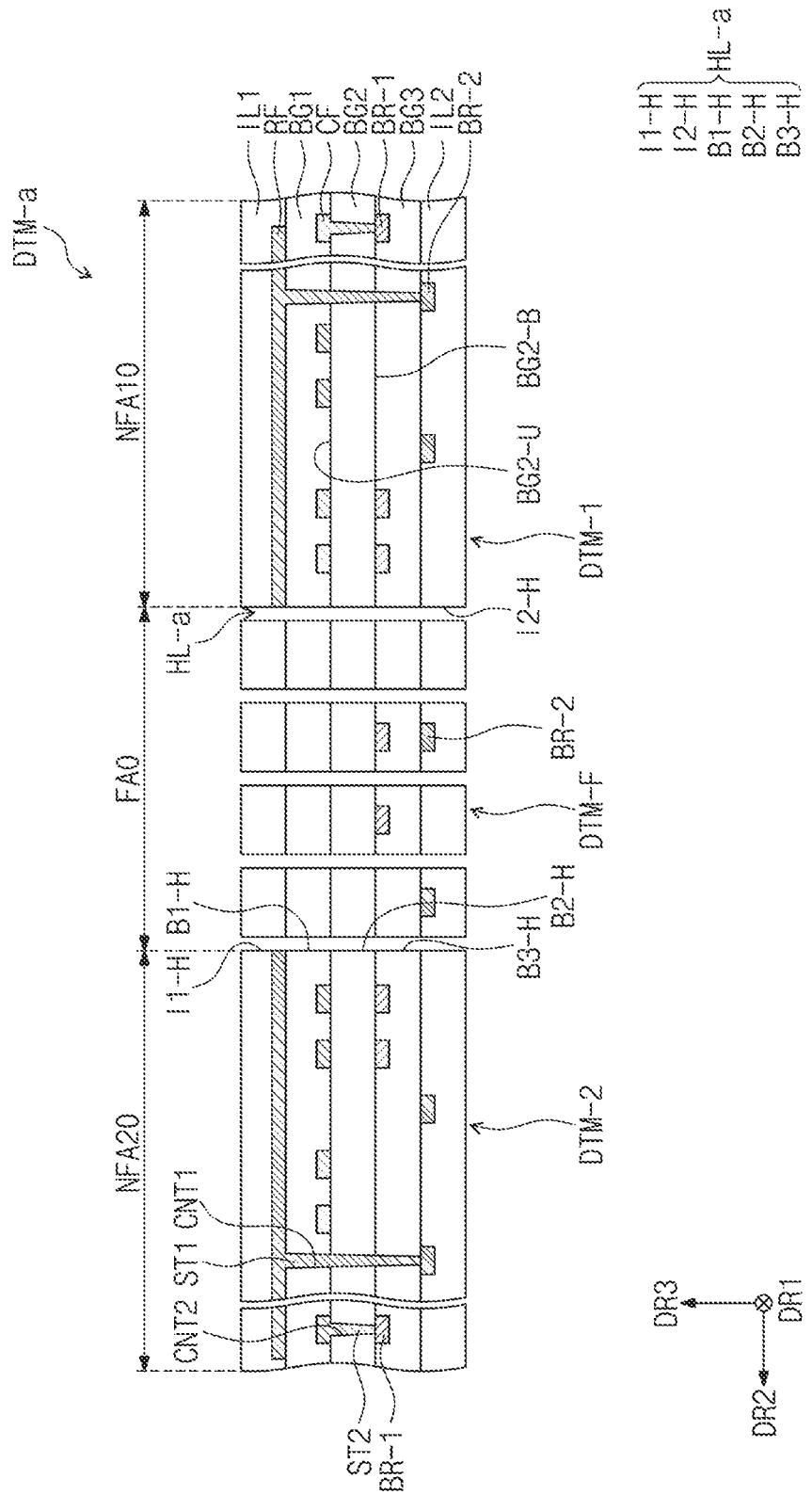
FIG. 6B is a cross-sectional view of a digitizer according to an embodiment of the present disclosure.

FIG. 6A is a cross-sectional view of a digitizer according to an embodiment of the present disclosure. FIG. 6B is a cross-sectional view of a digitizer according to an embodiment of the present disclosure.

Referring to FIG. 6A, the digitizer DTM according to an embodiment may include the first non-folding part DTM-1 overlapping the first non-folding region NFA10, the second folding part DTM-2 overlapping the second non-folding region NFA20, and the folding part DTM-F overlapping the folding region FA0, depending on regions. The plurality of holes HL may be defined in the folding part DTM-F.

The digitizer DTM according to an embodiment may include a first base layer BGT, a second base layer BG2, first loop coils RF, second loop coils CF, bridge patterns BR, a first cover layer IL1, and a second cover layer IL2. The first loop coils RF, the second loop coils CF, and the bridge patterns BR may include copper (Cu).

The first loop coils RF may be disposed on the first base layer BGT. A first base hole B1-H is defined in the first base layer BG1. The first base hole B1-H may be formed through the first base layer BG1 from a front surface to a rear surface of the first base layer BG1.

The second base layer BG2 may be disposed under the first base layer BG1. The second loop coils CF may be disposed on a front surface BG2-U of the second base layer BG2. The bridge patterns BR may be disposed on a rear surface BG2-B of the second base layer BG2. A second base hole B2-H is defined in the second base layer BG2. The second base hole B2-H may be formed through the second base layer BG2 from the front surface BG2-U to the rear surface BG2-B of the second base layer BG2. According to an embodiment, the second base layer BG2 may include a same material as the first base layer BG1.

The first cover layer IL1 may be disposed on the first base layer BG1 to cover the first loop coils RF. A first cover hole I1-H is defined in the first cover layer IL1. The first cover hole I1-H may be formed through the first cover layer IL1 from a front surface to a rear surface of the first cover layer IL1.

The second cover layer IL2 may be disposed on the rear surface BG2-B of the second base layer BG2 to cover the bridge patterns BR. A second cover hole I2-H is defined in the second cover layer IL2. The second cover hole I2-H may be formed through the second cover layer IL2 from a front surface to a rear surface of the second cover layer IL2. According to an embodiment, the first cover layer IL1 and the second cover layer IL2 may include a same material as the first base layer BG1.

The first base hole B1-H, the second base hole B2-H, the first cover hole I1-H, and the second cover hole I2-H aligned with each other in the third direction DR3 may form one hole HL. Accordingly, the inner surfaces defining the first base hole B1-H, the second base hole B2-H, the first cover hole I1-H, and the second cover hole I2-H, which are aligned with each other, may be aligned with each other in the third direction DR3. According to an embodiment, the first loop coils RF and the second loop coils CF may not be disposed in the folding part DTM-F. Accordingly, the arrangement design allowing the first loop coils RF and the second loop coils CF to pass through the holes HL may be omitted, thereby effectively preventing the first loop coils RF and the second loop coils CF from being cracked to be failed, when the electronic apparatus ED (see FIG. 1B) is folded.

Some of the first loop coils RF may be connected to the relevant bridge pattern BR through a first contact hole CNT1 defined through the first base layer BG1 and the second base layer BG2. A first connection pattern ST1 formed through copper-plating may be disposed in the first contact hole CNT1. One bridge pattern BR may electrically connect portions of one first loop coil RF, which are spaced apart from each other with the folding part DTM-F interposed between the first loop coils RF and receive a same signal, to each other. Accordingly, even if the first loop coils RF are not disposed on the folding part DTM-F, a single loop may be formed, which will be described later in greater detail.

Some of the second loop coils CF may be connected to the relevant bridge pattern BR through the second contact hole CNT2 defined through the second base layer BG2. A second connection pattern ST2 formed through copper-plating may be disposed in the second contact hole CNT2. One bridge pattern BR may electrically connect portions of one second loop coil CF, which are spaced apart from each other and output the same electromagnetic force while interposing the folding part DTM-F between the second loop coils CF. Accordingly, even if the second loop coils CF are not disposed on the folding part DTM-F, a single loop may be formed, which will be described later in greater detail.

Referring to FIG. 6B, a digitizer DTM-a according to an alternative embodiment may include the first non-folding part DTM-1 overlapping the first non-folding region NFA10, the second non-folding part DTM-2 overlapping the second non-folding region NFA20, and the folding part DTM-F overlapping the folding region FA0, depending on regions. A plurality of holes HL-a may be defined in the folding part DTM-F.

The digitizer DTM-a according to an embodiment may include the first base layer BG1, the second base layer BG2, a third base layer BG3, the first loop coils RF, second loop coils CF, first bridge patterns BR-1, second bridge patterns BR-2 (or sub-bridge patterns), the first cover layer IL1, and the second cover layer IL2. The first loop coils RF, the second loop coils CF, the first bridge patterns BR-1, and the second bridge patterns BR-2 may include copper (Cu).

The first loop coils RF may be disposed on the first base layer BG1. The first base hole B1-H is defined in the first base layer BG1. The first base hole B1-H may be formed through the first base layer BG1 from a front surface to a rear surface of the first base layer BG1.

The second base layer BG2 may be disposed under the first base layer BG1. The second loop coils CF may be disposed on the front surface BG2-U of the second base layer BG2. The bridge patterns BR may be disposed on the rear surface BG2-B of the second base layer BG2. The second base hole B2-H is defined in the 20 second base layer BG2. The second base hole B2-H may be formed through the second base layer BG2 from the front surface BG2-U to the rear surface BG2-B of the second base layer. According to an embodiment, the second base layer BG2 may include a same material as the first base layer BG1.

The third base layer BG3 may be disposed under the second base layer BG2. The second bridge patterns BR-2 may be disposed on a rear surface of the third base layer BG3. A third base hole B3-H may be formed through the third base layer BG3 from a front surface to a rear surface of the third base layer BG3 to be defined in the third base layer BG3. According to an embodiment, the third base layer BG3 may include a same material as the first base layer BG1.

The first cover layer IL1 may be disposed on the first base layer BG1 to cover the first loop coils RF. The first cover hole I1-H is defined in the first cover layer IL1. The first cover hole I1-H may be formed through the first cover layer IL1 from a front surface to a rear surface of the first cover layer IL1.

The second cover layer IL2 may be disposed on the rear surface of the third base layer BG3 to cover the second bridge patterns BR-2. The second cover hole I2-H is defined in the second cover layer IL2. The second cover hole I2-H may be formed through the second cover layer IL2 from a front surface to a rear surface of the second cover layer IL2. According to an embodiment, the first cover layer IL1 and the second cover layer IL2 may include a same material as the first base layer BG1.

Some of the first loop coils RF may be connected to the relevant second bridge pattern BR-2 through the first contact hole CNT1 defined through the first base layer BG1 and the third base layer BG3. Although FIG. 6B illustrates an embodiment where one of the first loop coils RF is connected to the second bridge pattern BR-2 through the first connection pattern ST1 disposed in the first contact hole CNT1, the present disclosure is not limited thereto. Some of the first loop coils RF may be connected to the relevant first bridge pattern BR-1 through a contact hole defined through the first base layer BG1 and the second base layer BG2.

At least any one of the first bridge pattern BR-1 and the second bridge pattern BR-2 may electrically connect portions of one first loop coils RF, which are spaced apart from each other with the folding part DTM-F interposed between the first loop coils RF and receive a same signal, to each other. Accordingly, even if the first loop coils RF are not disposed on the folding part DTM-F, a single loop may be formed, which will be described later in greater detail.

Some of the second loop coils CF may be connected to the relevant first bridge pattern BR-1 through the second contact hole CNT2 defined g through the second base layer BG2. Although FIG. 6B illustrates an embodiment where one of the second loop coils CF is connected to the first bridge pattern BR-1 through the second connection pattern ST2 disposed in the second contact hole CNT2, the present disclosure is not limited thereto. Some of the second loop coils CF may be connected to the relevant second bridge pattern BR-2 through a contact hole defined through the first base layer BG1 to the third base layer BG3.

In such an embodiment, at least one selected from the first and second bridge patterns BR-1 and BR-2 may electrically connect portions of one second loop coil CF, which are spaced apart from each other with the folding part DTM-F interposed between the first loop coils RF and receive a same signal. Accordingly, even if the second loop coils CF are not disposed on the folding part DTM-F, a single loop may be formed, which will be described later in great detail.

Figure 7A:
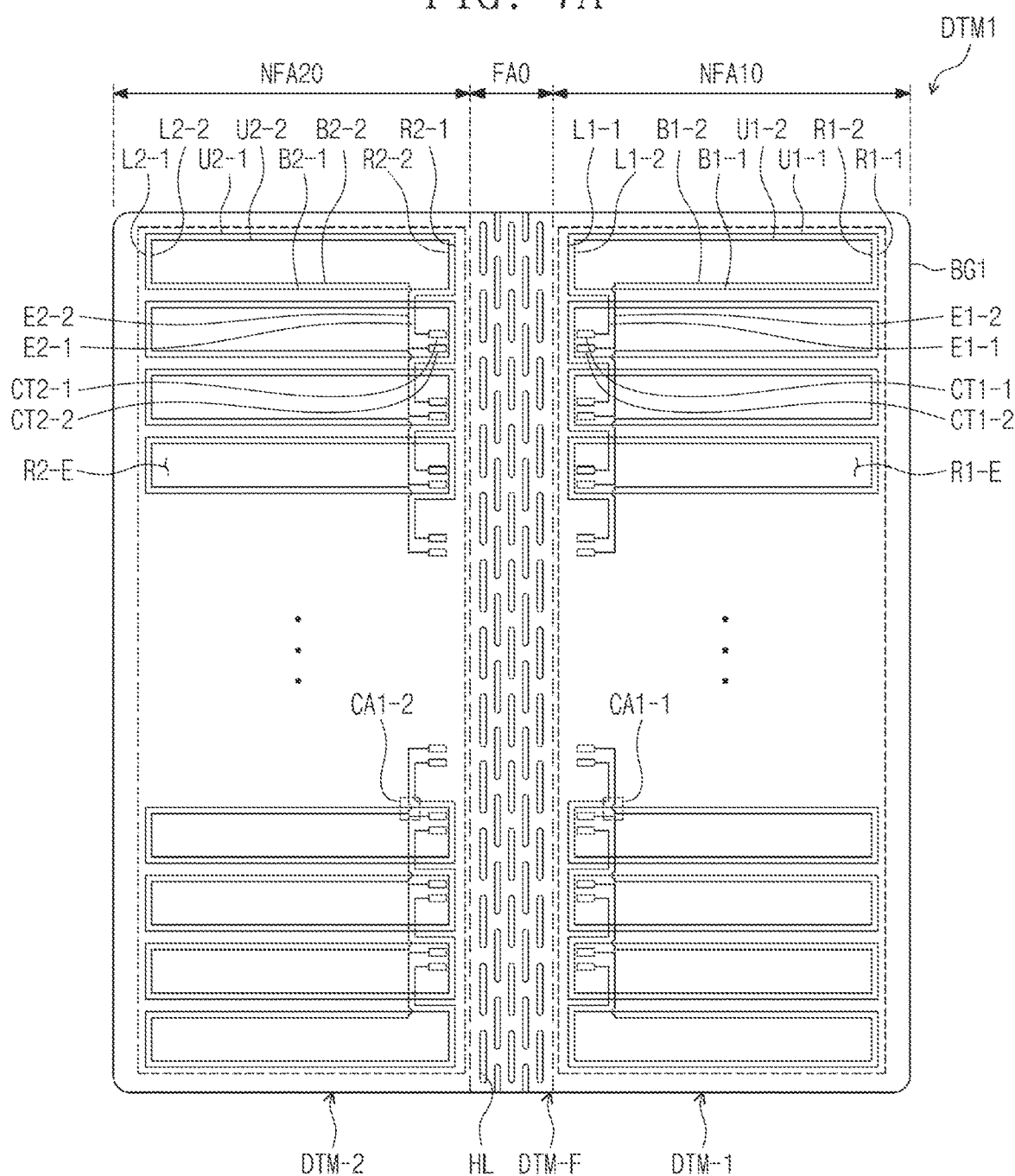
FIG. 7A is a plan view illustrating some layers included in a digitizer according to an embodiment of the present disclosure.
Figure 7B:
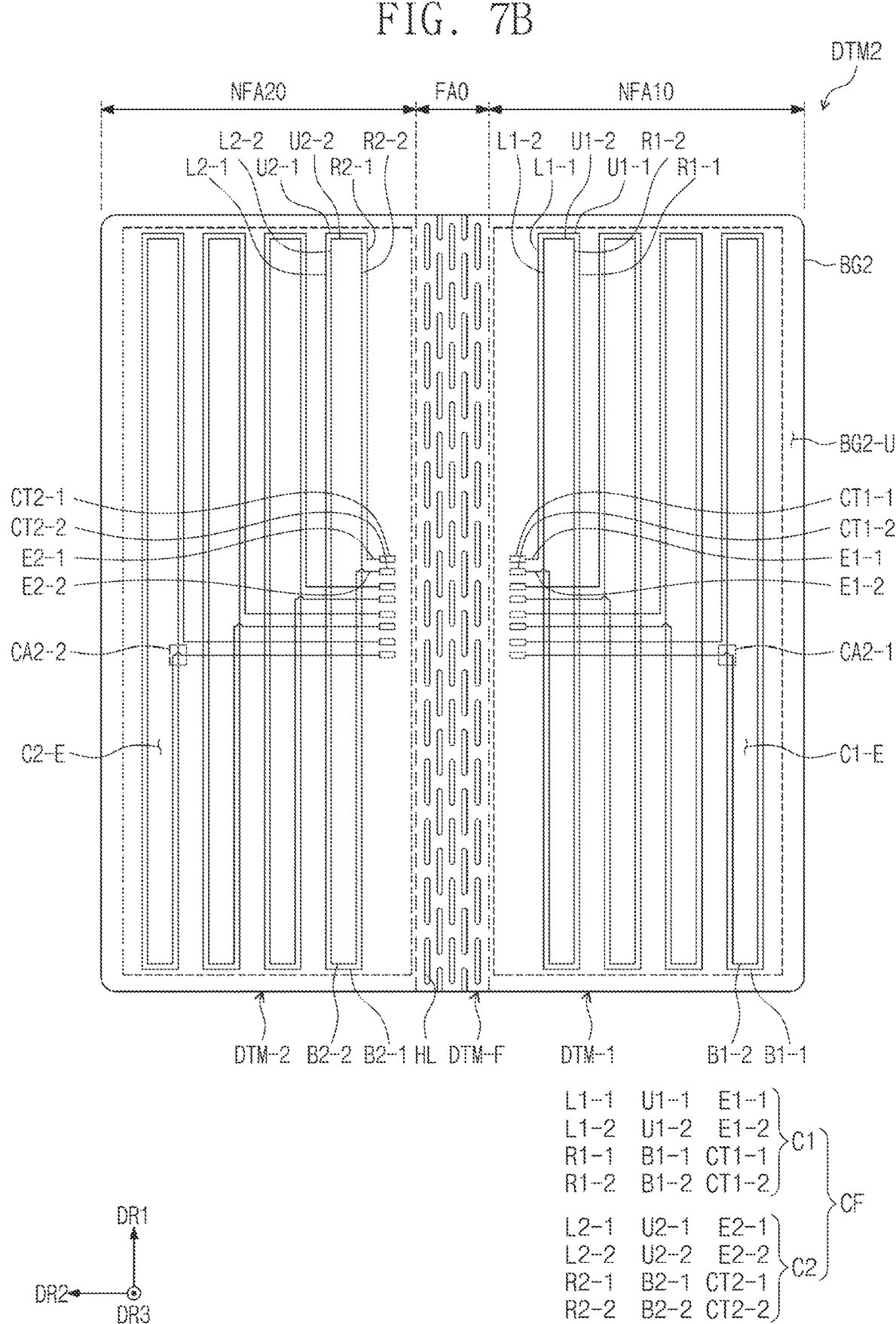
FIG. 7B is a plan view illustrating some layers included in a digitizer according to an embodiment of the present disclosure.
Figure 8A:
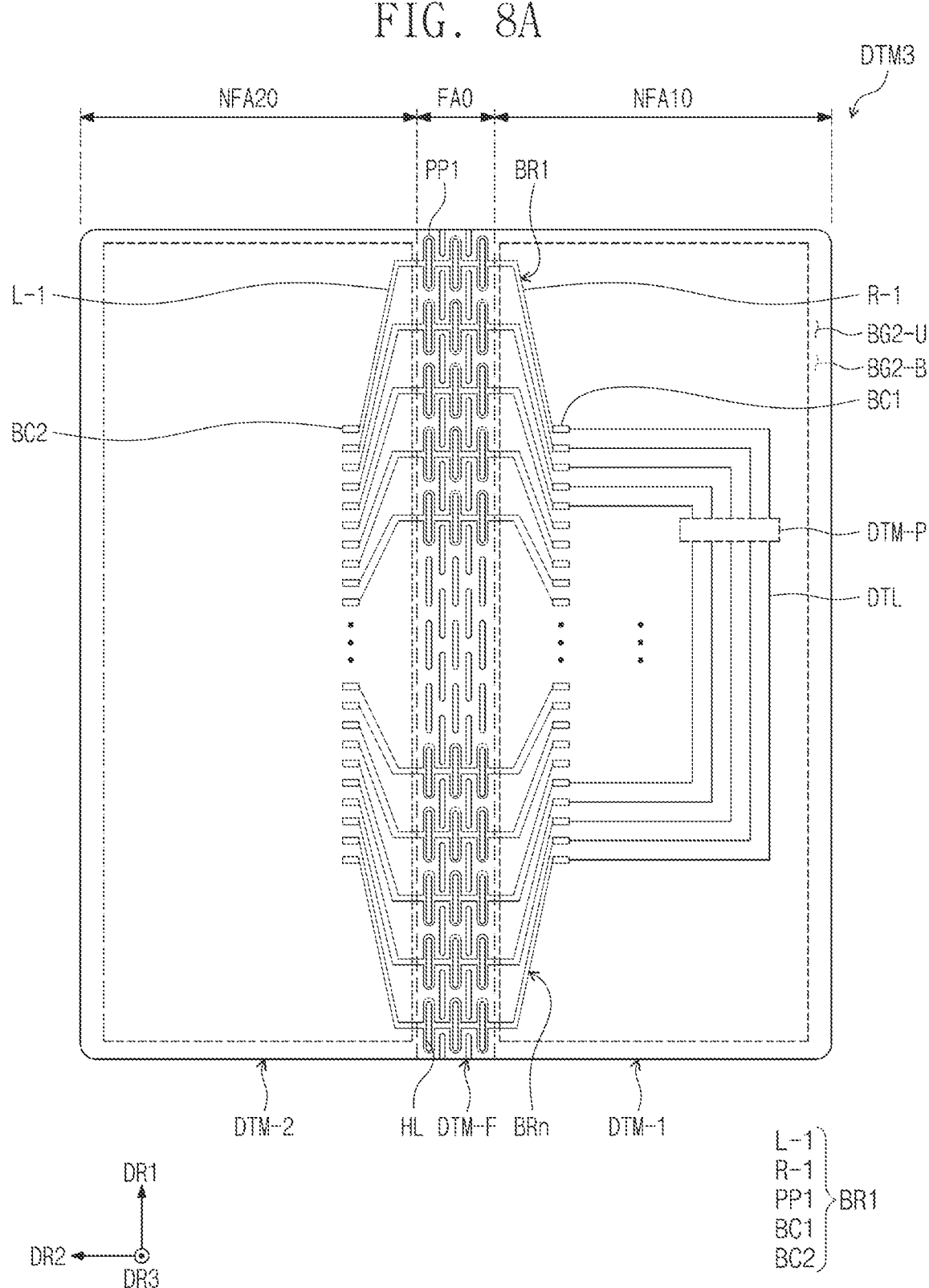
FIG. 8A is a plan view illustrating some layers included in a digitizer according to an embodiment of the present disclosure.
Figure 8B:
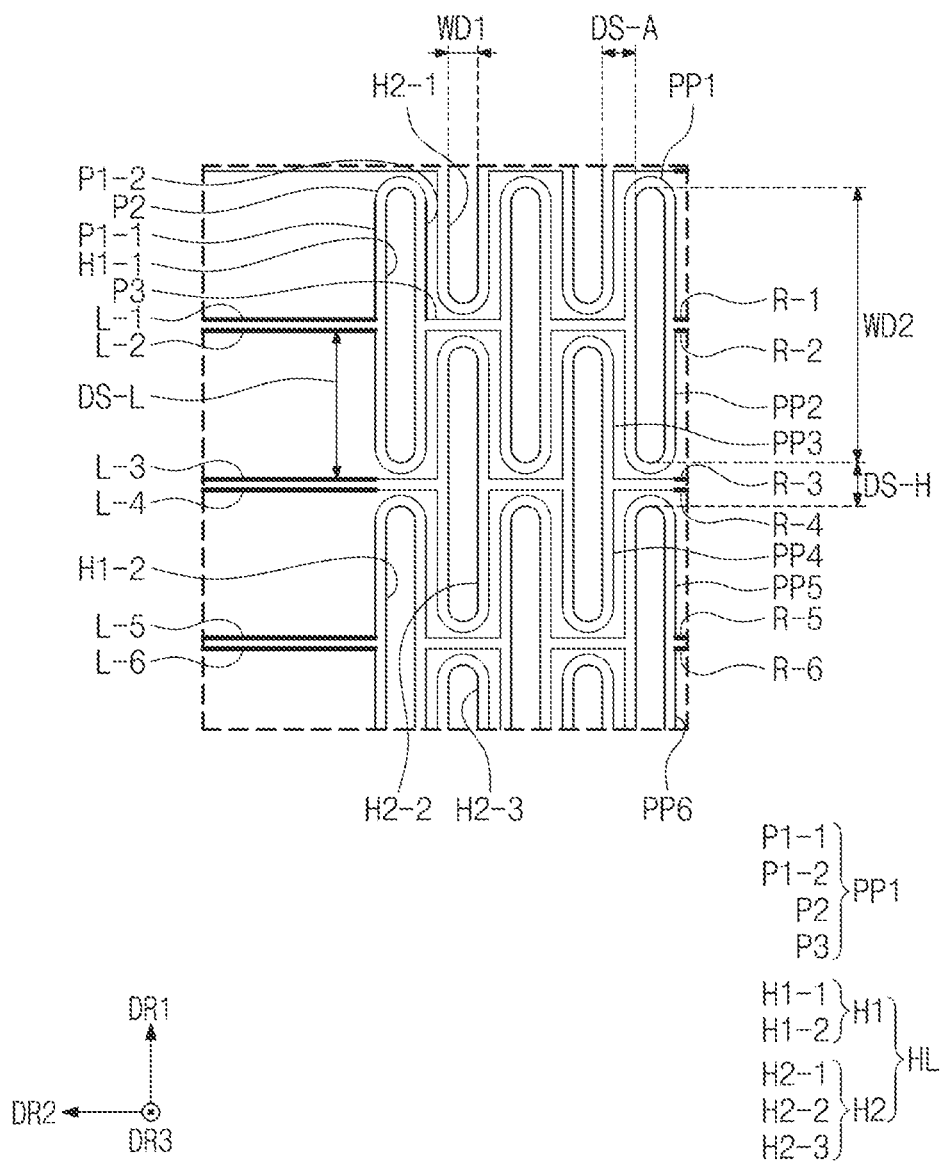
FIG. 8B is a plan view illustrating some layers included in a digitizer according to an embodiment of the present disclosure.
Figure 9:
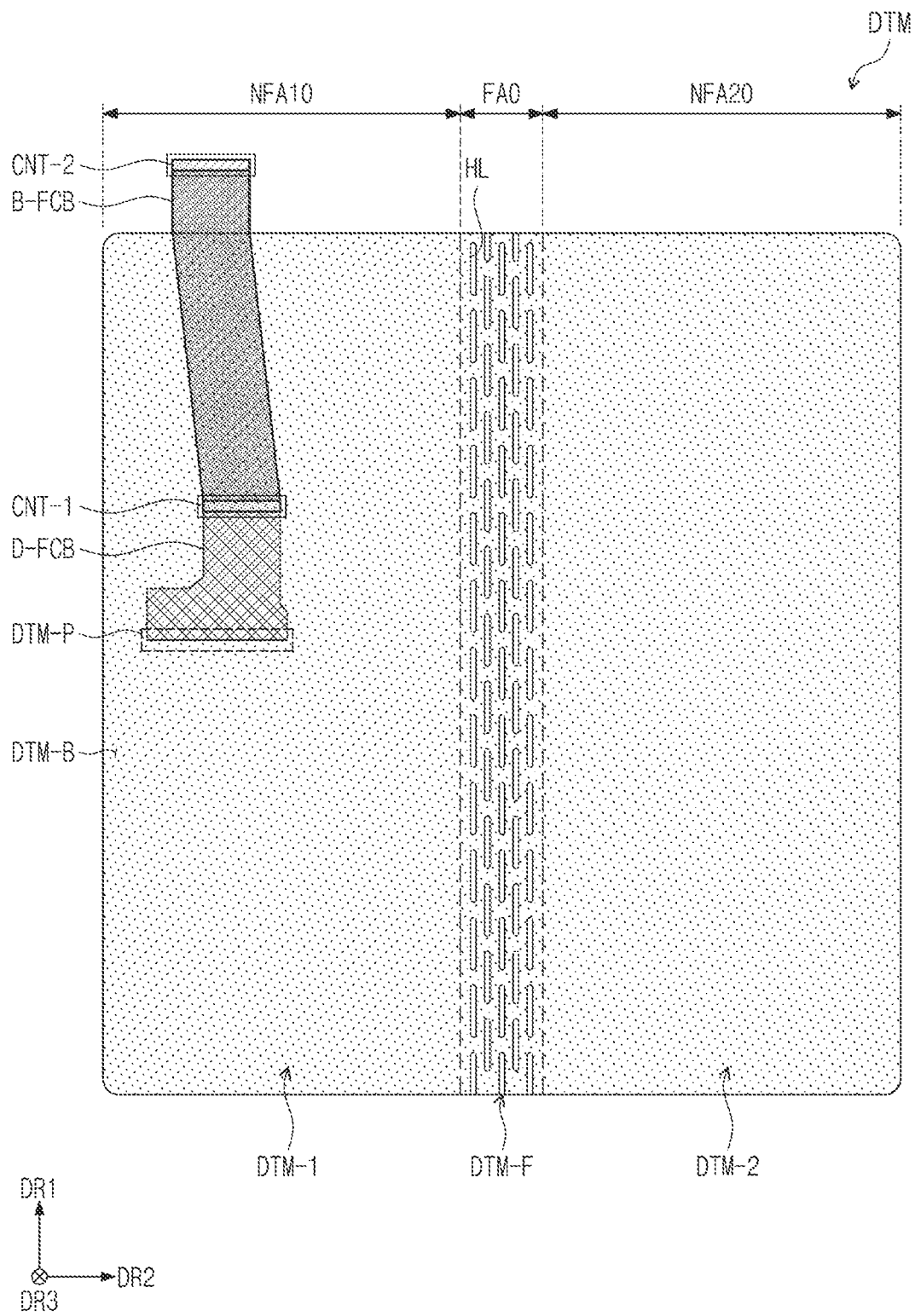
FIG. 9 is a rear view illustrating some layers included in a digitizer according to an embodiment of the present disclosure.

FIG. 7A is a plan view illustrating some layers included in a digitizer according to an embodiment of the present disclosure. FIG. 7B is a plan view illustrating some layers included in a digitizer according to an embodiment of the present disclosure. FIG. 8A is a plan view illustrating some layers included in a digitizer according to an embodiment of the present disclosure. FIG. 8B is a plan view illustrating some layers included in a digitizer according to an embodiment of the present disclosure. FIG. 9 is a rear view illustrating some layers included in a digitizer according to an embodiment of the present disclosure.

The first base layer BG1, the second base layer BG2, the first loop coils RF, the second loop coils CF, and the bridge patterns BR, BR-1, BR-2 shown in FIGS. 7A to 8B are substantially the same as those described with respect to FIGS. 6A and 6B, and any repetitive detailed description thereof will be omitted or simplified.

FIG. 7A illustrates a first sensing layer DTM1 of a plurality of layers included in the digitizer DTM (see FIG. 6A). The first sensing layer DTM1 may be defined as including the first loop coils RF and the first base layer BG1.

The first loop coils RF may be disposed on the first base layer BG1. Each of the first loop coils RF may include a first coil R1 disposed in the first non-folding part DTM-1 and a second coil R2 disposed in the second non-folding part DTM-2. The first coil R1 and the second coil R2 included in one first loop coil RF may be spaced apart from each other while interposing the folding part DTM-F between the first coil R1 and the second coil R2. The first coils R1 included in the mutually different first loop coils RF may be arranged in the first direction DR1. The second coils R2 included in the mutually different first loop coils RF may be arranged in the first direction DRT. The first coil R1 included in a same first loop coil RF may be arranged together with the second coil R2 spaced apart therefrom in the second direction DR2.

Each of the first coils R1 may include longer side lines U1-1, U1-2, B1-1, and B1-2, shorter side lines R1-1, R1-2, L1-1, and L1-2, connection parts E1-1 and E1-2, and contact parts CT1-1 and CT1-2.

Each of the longer side lines U1-1, U1-2, B1-1, and B1-2 may extend in the second direction DR2 and may be spaced apart from each other in the first direction DR1. Each of the shorter side lines R1-1, R1-2, L1-1, and L1-2 may extend in the first direction DR1 and may be spaced apart from each other in the second direction DR2. The connection parts E1-1 and E1-2 may extend from one of longer side lines U1-1, U1-2, B1-1, and B1-2 and shorter side lines R1-1, R1-2, L1-1, and L1-2, and the contact parts CT1-1 and CT1-2 may be connected to opposite ends of the relevant connection parts E1-1 and E1-2. The contact parts CT1-1 and CT1-2 may be disposed adjacent to the folding part DTM-F and may be spaced apart from contact parts CT1-1 and CT1-2 included in another first coils RI. The positions at which the contact parts CT1-1 and CT1-2 are disposed are provided only for the illustrative purpose. When viewed in a plan view or in the third direction DR3, positions of the contact parts CT1-1 and CT1-2 may be employed to various positions, as long as the contact parts CT1-1 and CT1-2 are spaced apart from the folding part DTM-F and overlap the first and second non-folding parts DTM-1 and DTM-2.

According to an embodiment, longer side lines U1-1, U1-2, B1-1, and B1-2, shorter side lines R1-1, R1-2, L1-1, and L1-2, and connection parts E1-1 and E1-2 may form an open loop. One of the connection parts E1-1 and E1-2 may overlap at least one selected from the longer side lines U1-1, U1-2, B1-1, and B1-2 and the shorter side lines R1-1, R1-2, L1-1, and L1-2.

FIG. 7A illustrates an embodiment where a second first connection part E1-2 crosses a first first longer side line B1-1 provided at a lower portion. A region at which the second first connection part E1-2 overlaps the first first longer side line B1-1 provided at a lower portion may be defined as a first crossing point CA1-1. A portion of the second first connection part E1-2 is disposed in the second base layer BG2 (see FIG. 6A), at the first crossing point CA1-1, and a remaining portion of the second first connection part E1-2 may be connected with the a portion of the second first connection part E1-2 through the contact holes defined in the first base layer BG1.

Accordingly, even if points at which the longer side lines U1-1, U1-2, B1-1, and B1-2 and the shorter side lines RI-1, RI-2, L1-1, and L1-2 overlap the connection parts E1-1 and E1-2 are formed, each of the first coils RI may form an open loop having a first inner space RI-E.

The contact parts CT1-1 and CT1-2 may be connected to the opposite ends of the relevant connection parts E1-1 and E1-2. The contact parts CT1-1 and CT1-2 according to an embodiment may overlap the first inner space RI-E defined in another first coil RI. A point at which the connection parts E1-1 and E1-2 of the first coil RI overlap the another first coil RI may be connected through a different base layer in a manner the same as a manner in which the first first longer side line B1-1 provided at a lower portion is connected to the second first connection part E1-2 at the first crossing point CA1-1. Accordingly, a separate space for arranging the contact parts CT1-1 and CT1-2 may be reduced.

The second coils R2 may include longer side lines U2-1, U2-2, B2-1, and B2-2, shorter side lines R2-1, R2-2, L2-1, and L2-2, connection parts E2-1 and E2-2, and contact parts CT2-1 and CT2-2.

Each of the longer side lines U2-1, U2-2, B2-1, and B2-2 may extend in the second direction DR2 and may be spaced apart from each other in the first direction DR1. Each of the shorter side lines R2-1, R2-2, L2-1, and L2-2 may extend in the first direction DR1 and may be spaced apart from each other in the second direction DR2. The connection parts E2-1 and E2-2 may extend from any one of the longer side lines U2-1, U2-2, B2-1, and B2-2 and the shorter side lines R2-1, R2-2, L2-1, and L2-2, and the contact parts CT2-1 and CT2-2 may be connected to the opposite ends of the corresponding connection parts E2-1 and E2-2. The contact parts CT2-1 and CT2-2 may be disposed adjacent to the folding part DTM-F and may be spaced apart from the contact parts CT2-1 and CT2-2 included in the other second coils R2. The positions at which the contact parts CT2-1 and CT2-2 are disposed are provided only for the illustrative purpose. When viewed in a plan view, positions of the contact parts CT2-1 and CT2-2 may be employed to various positions, as long as the contact parts CT1-1 and CT1-2 are spaced apart from the folding part DTM-F and overlap the first and second non-folding parts DTM-1 and DTM-2.

According to an embodiment, the longer side lines U2-1, U2-2, B2-1, B2-2, and B2-2, the shorter side lines R2-1, R2-2, L2-1, and L2-2, and the connection parts E2-1 and E2-2 may form an open loop. One of the connection parts E2-1 and E2-2 may overlap at least one selected from the longer side lines U2-1, U2-2, B2-1, and B2-2 and the shorter side lines R2-1, R2-2, L2-1, and L2-2.

FIG. 7A illustrates an embodiment where the second second connection part E2-2 crosses the first second longer side line B2-1 provided at a lower portion. A region at which the second second connection part E2-2 overlaps the first second longer side line B2-1 provided at a lower portion may be defined as a second crossing point CA1-2. A portion of the second second connection part E2-2 may be disposed in the second base layer BG2 (see FIG. 6A) at a second crossing point CA2-2, and the remaining portion of the second second connection part E2-2 may be connected to the portion of the second second connection part E2-2 through contact holes defined in the first base layer BG1.

Accordingly, even if points at which the longer side lines U2-1, U2-2, B2-1, and B2-2 and the shorter side lines R2-1, R2-2, L2-1, and L2-2 overlap the connection parts E2-1 and E2-2 are formed, the second coils R2 may form an open loop having a second inner space R2-E.

Each of the contact parts CT2-1 and CT2-2 may be connected to opposite ends of the relevant connection parts E2-1 and E2-2. The contact parts CT2-1 and CT2-2 according to an embodiment may overlap the second inner space R2-E defined in another second coil R2. A region at which the connection parts E2-1 and E2-2 of the second coil R2 overlap the another second coil R2 may be connected through a different base layer in a manner the same as the connection manner in which the first second longer side line B2-1 provided at a lower portion is connected to the second second connection part E2-2 at the second crossing point CA1-2. Accordingly, a separate space for arranging the contact parts CT2-1 and CT2-2 may be reduced.

FIG. 7B illustrates a second sensing layer DTM2 of a plurality of layers included in a digitizer DTM (see FIG. 6A). The second sensing layer DTM2 may be defined as including the second loop coils CF and the second base layer BG2.

The second loop coils CF may be disposed on the front surface BG2-U of the second base layer BG2. Accordingly, the second loop coils CF may be covered by the first base layer BG1 (see FIG. 6A).

Each of the second loop coils CF may include a first coil C1 disposed in the first non-folding part DTM-1 and a second coil C2 disposed in the second non-folding part DTM-2. The first coil C1 and the second coil C2 included in one second loop coil CF may be spaced apart from each other while interposing the folding part DTM-F between the first coil C1 and the second coil C2. The first coils C1 included in the second loop coils CF which are different from each other may be arranged in the second direction DR2. The second coils C2 included in the different second loop coils CF may be arranged in the second direction DR2.

The first coils C1 may include longer side lines R1-1, R1-2, L1-1, and L1-2, shorter side lines U1-1, U1-2, B1-1, and B1-2, the connection parts E1-1, and E1-2, and the contact parts CT1-1, and CT1-2.

The longer side lines R1-1, R1-2, L1-1, and L1-2 may extend in the first direction DR1 and may be spaced apart from each other in the second direction DR2. The shorter side lines U1-1, U1-2, B1-1, and B1-2 may extend in the second direction DR2 and may be spaced apart from each other in the first direction DR1. The connection parts E1-1 and E1-2 may extend from any one of the longer side lines U1-1, U1-2, B1-1, and B1-2 and the shorter side lines R1-1, R1-2, L1-1, and L1-2, and the contact parts CT1-1 and CT1-2 may be connected to the opposite ends of the relevant connection parts E1-1 and E1-2. The contact parts CT1-1 and CT1-2 may be disposed adjacent to the folding part DTM-F and may be spaced apart from contact parts CT1-1 and CT1-2 included in other first coils C1. The contact parts CT1-1 and CT1-2 of the first coil C1 included in each of the second loop coils CF may be spaced apart from the contact parts CT1-1 and CT1-2 of the first coil R1 included in each of the first loop coils RF described in FIG. 7A.

According to an embodiment, the longer side lines R1-1, R1-2, L1-1, L1-2, and L1-2, the shorter side lines U1-1, U1-2, B1-1, and B1-2, and the connection parts E1-1 and E1-2 may form an open loop. One of the connection parts E1-1 and E1-2 may overlap at least one selected from the longer side lines R1-1, R1-2, L1-1, and L1-2 and the shorter side lines U1-1, U1-2, B1-1, and B1-2.

FIG. 7B illustrates an embodiment where the second first connection part E1-2 crosses the second first inner longer side line L1-2. A region at which the second first connection part E1-2 overlaps the second first inner longer side line L1-2 may be defined as a first crossing point CA2-1. A portion of the second first connection part E1-2 may be disposed on the rear surface BG2-B (see FIG. 6A) of the second base layer BG2 at the first crossing point CA2-1, and the remaining portion of the second first connection part E1-2 may be disposed on the front surface BG2-U of the second base layer BG2. The remaining portion of the second first connection part E1-2 may be connected to the a portion of the second first connection part E1-2 through the contact holes defined in the second base layer BG2. Accordingly, even if points at which the longer side lines R1-1, R1-2, L1-1, and L1-2 and the shorter side lines U1-1, U1-2, B1-1, and B1-2 overlap the connection parts E1-1 and E1-2 are formed, each of the first coils C1 may form an open loop having a first inner space C1-E defined therein.

Each of the contact parts CT1-1 and CT1-2 may be connected to opposite ends of the relevant connection parts E1-1 and E1-2. A point at which the connection parts E1-1 and E1-2 of the first coil C1 overlap the another first coil C1 may be connected through a different base layer in a manner the same as the manner in which the second first longer side line L1-2 provided inside is connected to the second first connection part E1-2 at the first crossing point CA2-1. Accordingly, a separate space for arranging the contact parts CT1-1 and CT1-2 may be reduced.

The second coils C2 may include longer side lines R2-1, R2-2, L2-1, L2-2, and L2-2, shorter side lines U2-1, U2-2, B2-1, and B2-2, the connection parts E2-1, and E2-2, and the contact parts CT2-1 and CT2-2.

The longer side lines R2-1, R2-2, L2-1, and L2-2 may extend in the first direction DR1 and may be spaced apart from each other in the second direction DR2. The shorter side lines U2-1, U2-2, B2-1, and B2-2 may extend in the second direction DR2 and may be spaced apart from each other in the first direction DR1. The connection parts E2-1 and E2-2 may extend from any one of the longer side lines R2-1, R2-2, L2-1, and L2-2 and the shorter side lines U2-1, U2-2, B2-1, and B2-2, and the contact parts CT2-1 and CT2-2 may be connected to the opposite ends of the relevant connection parts E2-1 and E2-2. The contact parts CT2-1 and CT2-2 may be disposed adjacent to the folding part DTM-F and may be spaced apart from the contact parts CT2-1 and CT2-2 included in the other second coils C2. The contact parts CT2-1 and CT2-2 of the second coil C2 included in each of the second loop coils CF may be spaced apart from the contact parts CT2-1 and CT2-2 of the second coil R2 included in each of the first loop coils RF described in FIG. 7A.

According to an embodiment, the longer side lines R2-1, R2-2, L2-1, and L2-2, and the shorter side lines U2-1, U2-2, B2-1, and B2-2, and the connection parts E2-1 and E2-2 may form an open loop. One of the connection parts E2-1 and E2-2 may overlap at least one selected from the longer side lines R2-1, R2-2, L2-1, and L2-2 and the shorter side lines U2-1, U2-2, B2-1, and B2-2.

FIG. 7B illustrates an embodiment where the second second connection part E2-2 crosses the second second longer side line R2-2 provided inside. A region at which the second second connection part E2-2 overlaps the second second longer side line R2-2 provided inside may be defined as the second crossing point CA2-2. A portion of the second second connection part E2-2 may be disposed on the rear surface BG2-B (see FIG. 6A) of the second base layer BG2 (see FIG. 6A) at the second crossing point CA2-2, and the remaining portion of the second second connection part E2-2 may be disposed on the front surface BG2-U of the second base layer BG2. The remaining portion of the second second connection part E2-2 may be connected to the portion of the second second connection part E2-2 through the contact holes defined in the second base layer BG2. Accordingly, even if points at which the longer side lines R2-1, R2-2, L2-1, and L2-2 and the shorter side lines U2-1, U2-2, B2-1, and B2-2 overlap the connection parts E2-1 and E2-2 are formed, the second coils C2 may form an open loop having a second inner space C2-E defined therein.

Each of the contact parts CT2-1 and CT2-2 may be connected to opposite ends of the relevant connection parts E2-1 and E2-2. A point at which the connection parts E2-1 and E2-2 of the second coil C2 overlap the another second coil C2 may be connected through a different base layer in a manner the same as a manner in which the connection manner of the second second longer side line R2-2 provided inside is connected to the second second connection part E2-2 at the second crossing point CA2-2. Accordingly, a separate space for arranging the contact parts CT2-1 and CT2-2 may be reduced.

FIG. 8A illustrates a bridge layer DTM3 of a plurality of layers included in the digitizer DTM (see FIG. 6A). The bridge layer DTM3 may be defined as including bridge patterns BR1-BRn and the second base layer BG2. The bridge layer DTM3 may include the bridge patterns BR1-BRn, signal lines DTL, and bridge pad parts DTM-P disposed on the rear surface BG2-B of the second base layer BG2.

The following description will be made while focusing on the components included in the first bridge pattern BR1, and the description on the first bridge pattern BR1 may be applied to remaining bridge patterns BRn.

The first bridge pattern BR1 may include a first line R-1 disposed in the first non-folding region NFA10, a second line L-1 disposed in the second non-folding region NFA20, a third line PP1 connected to one end of each of the first line R-1 and the second line L-1 while crossing the folding region FA0, and bridge contact parts BC1 and BC2 connected to opposite ends of the first line R-1 and the second line L-1, respectively. The positions at which the bridge contact parts BC1 and BC2 are disposed are provided only for the illustrative purpose. When viewed in a plan view, positions of the bridge contact parts BC1 and BC2 may be employed to various positions, as long as the bridge contact parts BC1 and BC2 overlap contact parts of the first coils R1 or the second coils R2 corresponding to the bridge contact parts BC1 and BC2, which are spaced apart from the folding part DTM-F, and overlap the first and second non-folding parts DTM-1 and DTM-2, respectively.

One end of each of the signal lines DTL may be connected to the relevant one of the bridge patterns BR1 to BRn, or may be connected to any one of the contact parts CT1-1 and CT1-2 illustrated in FIG. 7A and the contact parts CT2-1 and CT2-2 illustrated in FIG. 7B. An opposite end of each of the signal lines DTL may be connected to pads included in the bridge pad part DTM-P. The pads may be exposed from the rear surface BG2-B of the second base layer BG2.

Referring to FIG. 9, the bridge pad part DTM-P may be disposed on a rear surface DTM-B of the digitizer DTM. The rear surface DTM-B may be defined as a rear surface of the second cover layer IL2 described with reference to FIGS. 6A and 6B. According to an embodiment of the present disclosure, a single circuit board D-FCB may be attached to the bridge pad part DTM-P. Pads connected to opposite ends of the signal lines DTL are disposed in the bridge pad part DTM-P, and the pads may be connected to substrate pads included in the circuit board D-FCB through an anisotropic conductive film. A first connection part CNT-1 of a bridge substrate B-FCB may be connected to one end of the circuit board D-FCB. A second connection part CNT-2 of the bridge substrate B-FCB may be connected to the electronic module EM described in FIGS. 2A and 2B.

According to an embodiment of the present disclosure, even if the loop coils RF and CF are spaced apart from each other while interposing the folding part DTM-F between the loop coils RF and CF, the loop coils RF and CF may be connected to the bridge layer DTM3 and driven through the single circuit board D-FCB. Accordingly, the number of circuit boards and bridge boards for simultaneously driving coils disposed in the non-folding parts DTM-1 and DTM-2 may be reduced. Accordingly, the electronic apparatus ED (see FIG. 1A) including the digitizer DTM (see FIG. 5A) reduced in costs may be provided.

According to an embodiment, one of the bridge patterns BR1 to BRn may electrically connect the first coil R1 and the second coil R2 included in the one first loop coil RF described in FIG. 7A. In an embodiment, for example, the first first contact part CT1-1 of the first coil R1 described with reference to FIG. 7A may be connected to the first bridge contact part BC1 of one bridge pattern. The first second contact part CT2-1 of the second coil R2 included in the first loop coil RF may be connected to the second bridge contact part BC2 of any one of the bridge patterns. The first first contact part CT1-1 and the first second contact part CT2-1 may be connected to the corresponding bridge contact parts BC1 and BC2 through contact holes formed through the first base layer BG1 and the second base layer BG2 described with reference to FIG. 6A.

Therefore, even if the first coil R1 and the second coil R2 included in the first loop coil RF are spaced apart from each other while interposing the folding part DTM-F therebetween, the first coil R1 and the second coil R2 may be electrically connected through one of the bridge patterns disposed on another layer.

According to an embodiment, another of the bridge patterns BR1 to BRn may electrically connect the first coil C1 and the second coil C2 included in the one second loop coil CF described with reference to FIG. 7B. In an embodiment, for example, the first first contact part CT1-1 of the first coil C1 described with reference to FIG. 7B may be connected to the first bridge contact part BC1 of another bridge pattern. The first second contact part CT2-1 of the second coil C2 included in the second loop coil CF may be connected to the second bridge contact part BC2 of the another bridge pattern. The first first contact part CT1-1 and the first second contact part CT2-1 may be connected to the corresponding bridge contact parts BC1 and BC2 through contact holes defined or formed through the second base layer BG2 described with reference to FIG. 6A.

Therefore, even if the first coil C1 and the second coil C2 included in the second loop coil CF are spaced apart from each other while interposing the folding part DTM-F therebetween, the first coil C1 and the second coil C2 may be electrically connected to each other through another bridge pattern disposed on another layer.

According to an embodiment, the first loop coils RF described with reference to FIG. 7A may be referred to as driving coils, and the second loop coils CF described with reference to FIG. 7B may be referred to as sensing coils, but the present disclosure is not limited thereto. In an embodiment, for example, the first loop coils RF described with reference to FIG. 7A may be referred to as sensing coils, and the second loop coils CF described with reference to FIG. 7B may be referred to as driving coils.

The bridge contact parts BC1 and BC2 of the bridge pattern are connected to the first first contact part CT1-1 included in the first coil R1 of the first loop coils RF and the first second contact part CT2-1 included in the second coil R2 of the first loop coils RF as described with reference to FIG. 7A to form one open loop, and an alternating current (AC) signal may be sequentially provided to the second first contact part CT1-2 included in the first coil R1. The second second contact part CT2-2 included in the second coil R2 may be grounded together with the second first contact part CT1-2 included in the first coil R1. The second first contact part CT1-2 included in the first coil R1 may be connected to a relevant signal line of the signal lines DTL included in the bridge layer DTM3.

When a current flows through the first loop coils RF, a magnetic force line may be induced between the first loop coils RF and the second loop coils CF. The bridge contact parts BC1 and BC2 of the bridge pattern may be connected to the first first contact part CT1-1 included in the first coil C1 and the first second contact part CT2-1 included in the second coil C2 to form one open loop. The second loop coils CF, which serves a sensing circuit to sense induced electromagnetic force emitted from a pen or the like, may output the induced electromagnetic force to the second first contact part CT1-2 included in the first coil C1 of the second loop coils CF. The second second contact part CT2-2 included in the second coil C2 may be grounded together with the second first contact part CT1-2 included in the first coil C1. The second first contact part CT1-2 included in the first coil C1 may be connected to a relevant signal line of the signal lines DTL included in the bridge layer DTM3.

According to an embodiment of the present disclosure, even if the loop coils RF and CF disposed in the first sensing layer DTM1 and the second sensing layer DTM2 are spaced apart from each other while interposing the folding part DTM-F therebetween, as the loop coils RF and CF are connected to each other through the bridge layer DTM3, the sensing coils disposed in the folding part DTM-F may be omitted. Accordingly, the digitizer DTM (see FIG. 6A) improved in sensing sensitivity may be provided by omitting sensing coils changed in shape to pass between the holes HL of the folding part DTM-F.

FIG. 8B illustrates first lines R-1, R-2, R-3, R-4, R-5, and R-6, second lines L-1, L-2, L-3, L-4, L-5, and L-6, and third lines PP1, PP2, PP3, PP4, PP5, and PP6 included in the first to sixth bridge patterns among the bridge patterns BR1-BRn described with reference to FIG. 8A.

Referring to FIG. 8B, each of the holes HL defined in the folding part DTM-F may have a first width WD1 in the second direction DR2. The first width WD1 may be about 0.1 mm or greater and about 0.5 mm or less. Each of the holes HL may have a second width WD2 in the first direction DR1. The second width WD2 may be about 4 mm or greater and about 10 mm or less.

According to an embodiment, the holes HL may include a first group hole H1 and a second group hole H2. In an embodiment, for example, the first group hole H1 may include a first first hole H1-1 and a second first hole H1-2 arranged in the first direction DR1. The second group hole H2 may be spaced apart from the first group hole H1 in the second direction DR2, and may include a first second hole H2, a second second hole H2-2, and a third second hole H2-3 arranged in the first direction DR1.

According to an embodiment, the second group hole H2 may be shifted from the first group hole H1 by a specific distance in the first direction DRT. According to an embodiment, the shifted distance may be less than or equal to half of the second width WD2. Accordingly, the shape of the remaining portion of the folding part DTM-F except for the holes HL may have a slit shape having a lattice pattern.

According to an embodiment, when viewed in the second direction DR2, a first separation distance DS-A between overlapped holes of holes included in different group holes, for example, the first spacing distance DS-A between the first first holes H1-1 of the first group hole H1 and the first second hole H2-1 of the second group hole H2 may be about 0.1 mm or greater and about 0.3 mm or less.

A second spacing DS-H, which is between holes HL adjacent to each other in the first direction DR1, of holes included in the same group hole in the first direction DR1, for example, the second spacing DS-H between the first first hole H1-1 and the second first hole H1-2 in the first direction DR1 may be about 0.1 mm or greater and about 0.3 mm or less.

Each of the third lines PP1, PP2, PP3, PP4, PP5, and PP6 disposed in the folding part DTM-F may include a plurality of patterns P1-1, P1-2, P2, and P3 connected to each other. Each of the third lines PP1, PP2, PP3, PP4, PP5, and PP6 may include the first first pattern P1-1, the second first pattern P1-2, the second pattern P2, and the third pattern P3.

Each of the first first pattern PI-1 and the second first pattern P1-2, may extend in the first direction DR1 and may be spaced apart from each other in the second direction DR2 while interposing the relevant hole HL between the first first pattern P1-1 and the second first pattern P1-2. The second pattern P2 may be connected to one end of each of the first first pattern P1-1 and the second first pattern P1-2 to connect the first first pattern P1-1 to the second first pattern P1-2.

One end of the third pattern P3 may be connected to the opposite end of the second first pattern P1-2, and the opposite end of the third pattern P3 may be connected to an opposite end of the first first pattern P1-1 of another pattern PP which is subsequent.

According to an embodiment, the number of patterns included in a same group and disposed between adjacent holes HL may be four or less. Therefore, one pattern may be disposed between some adjacent holes HL, and patterns may not be disposed between other adjacent holes HL.

Figure 10:
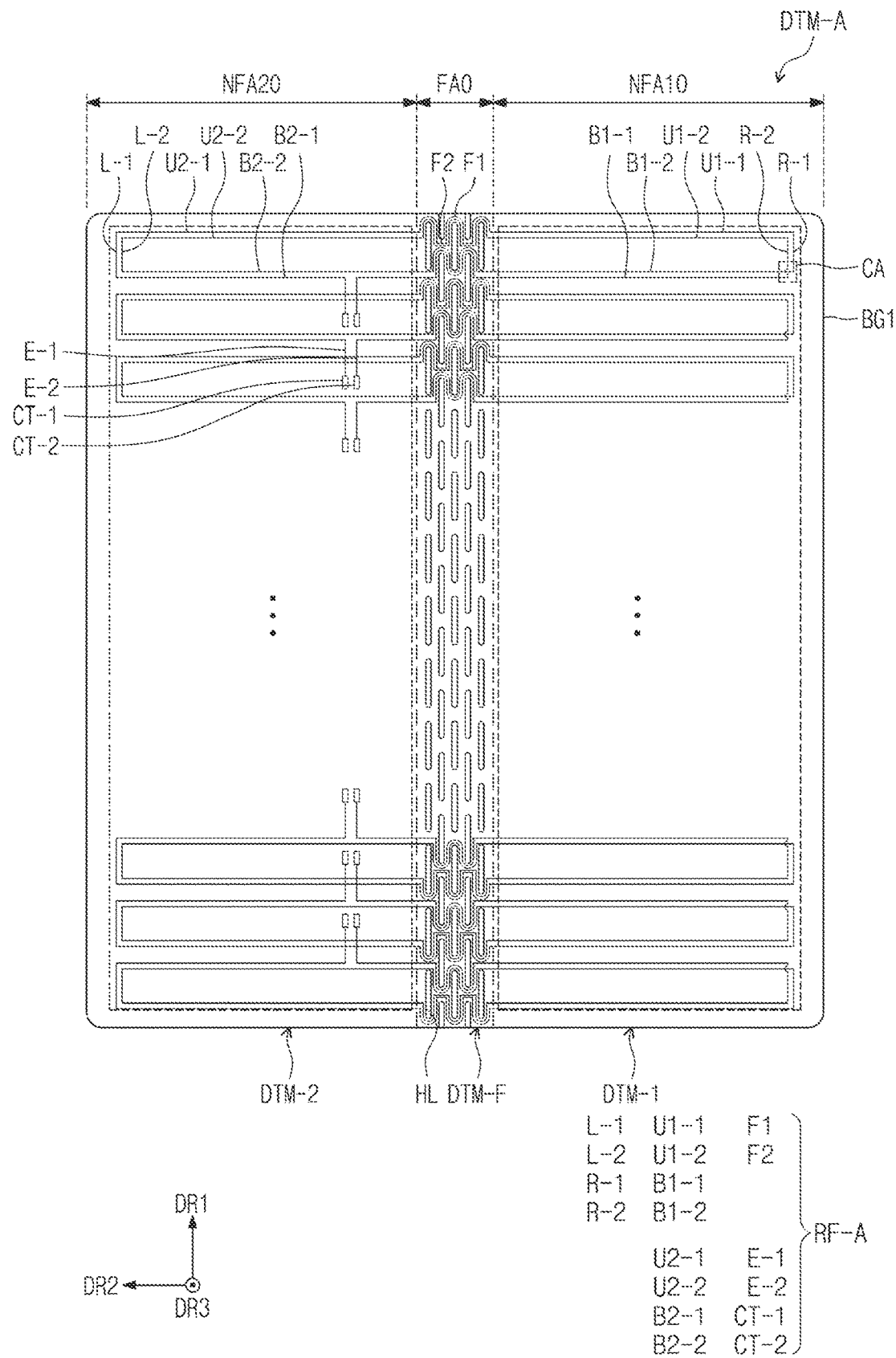
FIG. 10 is a plan view illustrating some layers included in a digitizer according to an embodiment of the present disclosure.
Figure 11:
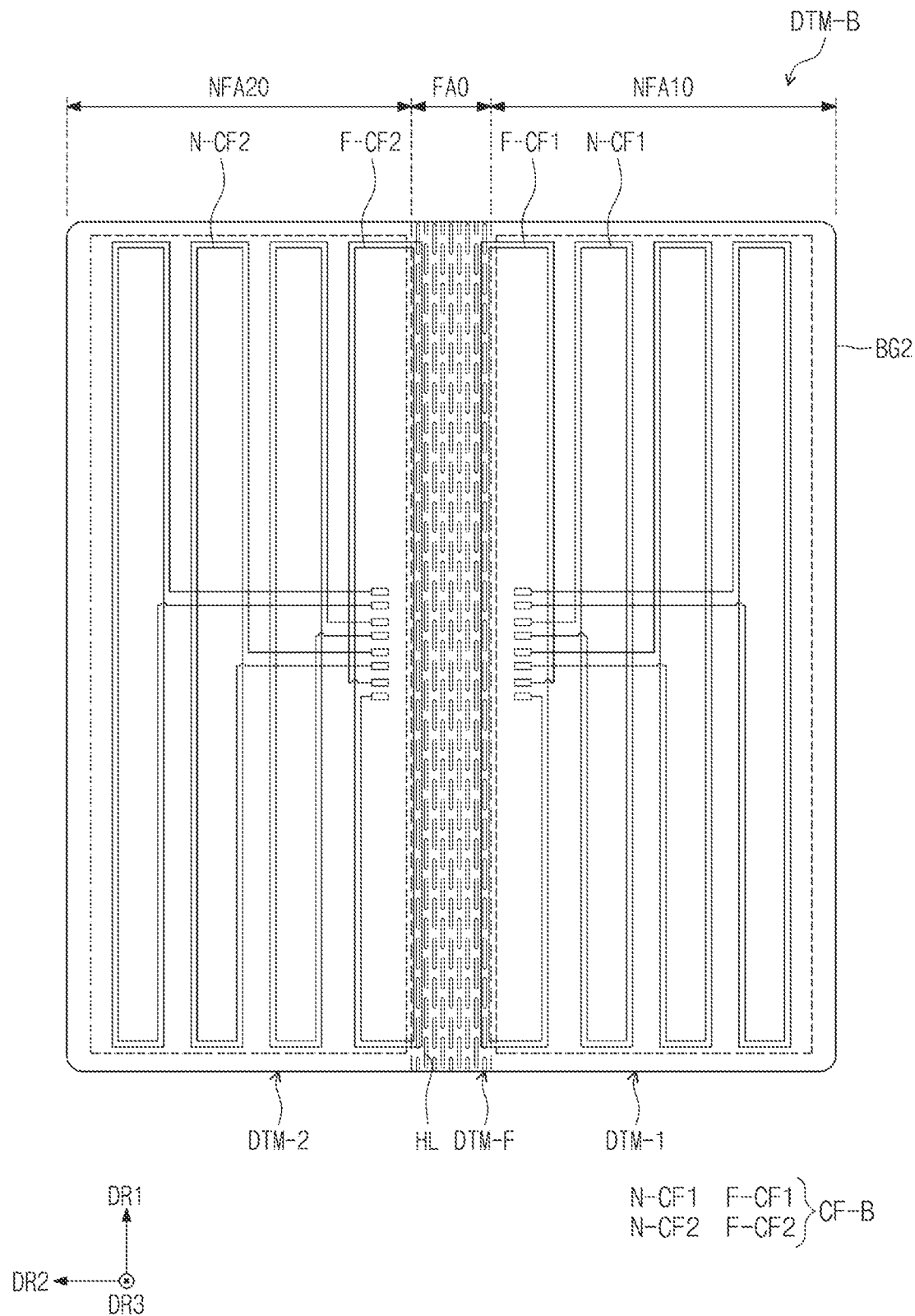
FIG. 11 is a plan view illustrating some layers included in a digitizer according to an embodiment of the present disclosure.

FIG. 10 is a plan view illustrating some layers included in a digitizer according to an embodiment of the present disclosure. FIG. 11 is a plan view illustrating some layers included in a digitizer according to an embodiment of the present disclosure. The same/similar reference numerals will be assigned to the same/similar components as/to components described with reference to FIGS. 1A to 8B, and any repetitive detailed description thereof will be omitted. Referring to FIG. 10, a first sensing layer DTM-A according to an embodiment may include first loop coils RF-A disposed on the first base layer BG1.

The first loop coils RF-A may include longer side lines U1-1, U1-2, B1-1, B1-2, U2-1, U2-2, B2-1, and B2-2, and shorter side lines R-1, R-2, L-1, and L-2, connection parts E-1 and E-2, and contact parts CT-1 and CT-2. The first loop coils RF-A according to an embodiment may further include extending parts F1 and F2 disposed in the folding part DTM-F.

The first longer side lines U1-1, U1-2, B1-1, and B1-2 and the first shorter side lines R-1 and R-2 may be disposed on the first non-folding part DTM-1. The second longer side lines U2-1, U2-2, B2-1, and B2-2 and the second shorter side lines L-1 and L-2 may be disposed on the second non-folding part DTM-2.

The connection parts E-1 and E-2 may extend from any one of the longer side lines B1-1 and B2-1 which are provided at a lower portion, and the contact parts CT-1 and CT-2 may be connected to the opposite ends of the corresponding connection parts E-1 and E-2.

The extending parts F1 and F2 may be connected to corresponding longer side lines of the longer side lines U1-1, U1-2, B1-1, B1-2, U2-1, U2-2, B2-1, and B2-2 spaced apart from each other while interposing the folding part DTM-F therebetween. Accordingly, the first loop coils RF-A may form an open loop.

A region at which the second first connection part R-2 provided inside overlaps the second first longer side line B1-2 provided at a lower portion may be defined as a crossing point CA. A portion of the second first shorter side part R-2 provided inside may be disposed on a front surface BG-U (see FIG. 6A) of the second base layer BG2 at the second crossing point CA, and the remaining portion of the second first shorter side part R-2 provided inside may be connected to the portion of the second first shorter side part R-2 provided inside through the contact holes defined in the first base layer BG1. Accordingly, even if a point at which the longer side lines U1-1, U1-2, B1-1, B1-2, U2-1, U2-2, B2-1, and B2-2 overlap the shorter side lines R-1, R-2, L-1, and L-2 is formed, the first loop coils RF-A may form an open loop.

According to an embodiment, each of the extending parts F1 and F2 may include a plurality of patterns. The shape in which the extending parts F1 and F2 are disposed in the folding part DTM-F may be similar to the plurality of patterns P1-1, P1-2, P2, and P3 described with respect to FIG. 8B. Accordingly, the number of extending portions F1 and F2 disposed between adjacent holes HL may be four or less. Accordingly, the induced electromagnetic force emitted from the pen or the like may be easily sensed even in the folding part DTM-F.

When the first loop coils RF-A included in the first sensing layer DTM-A are disposed in the folding part DTM-F according to an embodiment, contact parts, which are for connecting coils spaced apart from each other while interposing the folding part DTM-F therebetween, of the bridge contact parts BC1 and BC2 described with reference to FIG. 8A may be omitted.

Referring to FIG. 11, a second sensing layer DTM-B according to an embodiment may include second loop coils CF-B disposed on the second base layer BG2.

The loop coils CF-B may include first normal coils N-CF1 disposed in the first non-folding part DTM-1, second normal coils N-CF2 disposed in the second non-folding part DTM-2, and first and second overlap coils F-CF1 and F-CF2. In such an embodiment the normal coils N-CF1 and N-CF2 may be substantially the same as the first coils C1 and the second coils C2 described above with reference to FIG. 7B.

A portion of the first overlap coil F-CF1 may be disposed in the folding part DTM-F adjacent to the first non-folding part DTM-1. A portion of the second overlap coil F-CF2 may be disposed in the folding part DTM-F adjacent to the second non-folding part DTM-2. Accordingly, the induced electromagnetic force emitted from the pen or the like may be easily sensed even in the folding part DTM-F.

Figure 12A:
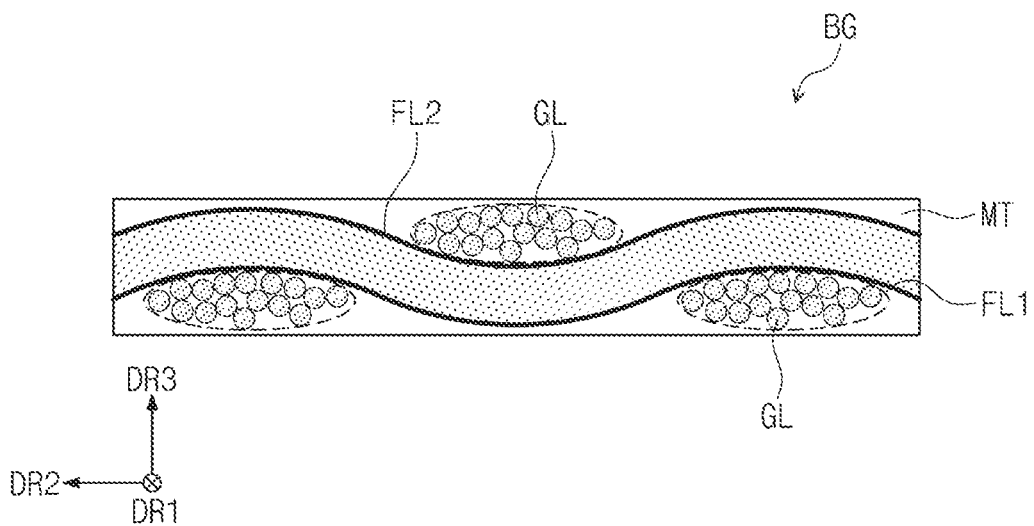
FIG. 12A is a sectional view of a base layer included in a digitizer according to an embodiment of the present disclosure.
Figure 12B:
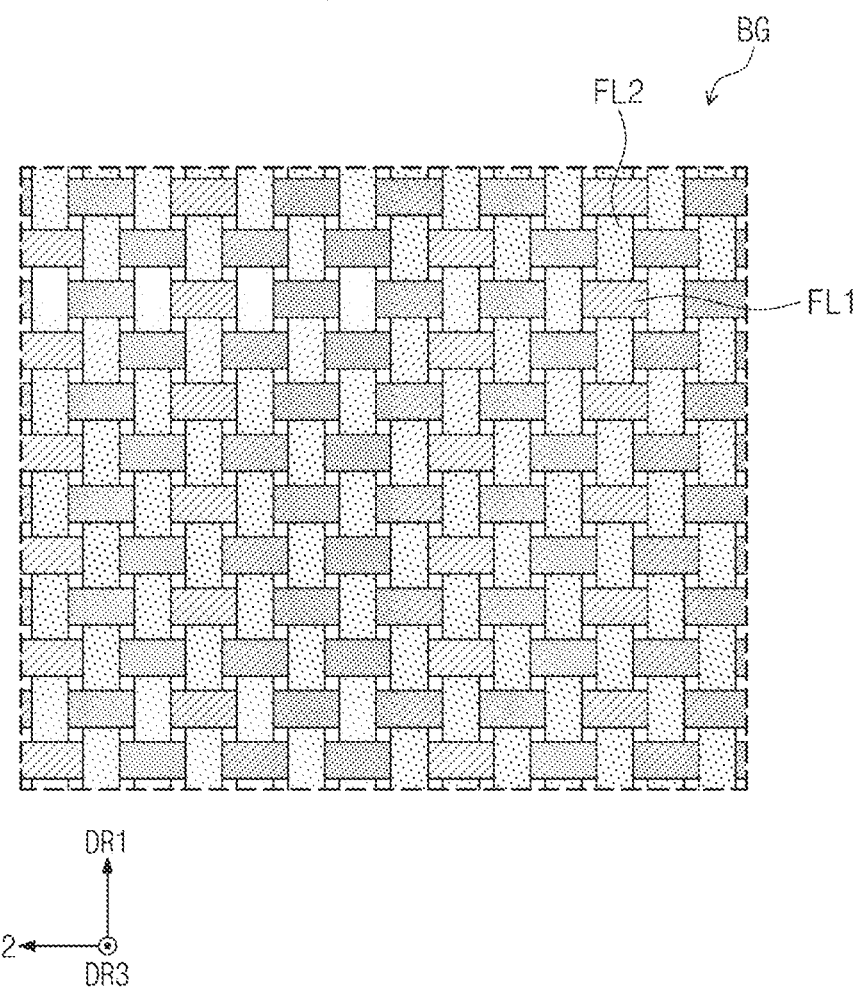
FIG. 12B is a sectional view of a base layer included in a digitizer according to an embodiment of the present disclosure.

FIG. 12A is a sectional view of a base layer included in a digitizer according to an embodiment of the present disclosure. FIG. 12B is a sectional view of a base layer included in a digitizer according to an embodiment of the present disclosure. The features of the base layer BG to be described hereinafter with reference to FIGS. 12A and 12B may be applied to the base layers BG1, BG2, and BG3 and the cover layers IL1 and IL2 described in FIGS. 6A and 6B.

Referring to FIGS. 12A and 12B, the base layer BG according to an embodiment may include a matrix MT including a filler and fiber lines FL1 and FL2 having a woven shape disposed in the matrix MT.

The fiber lines FL1 and FL2 may be alternately arranged in the first direction DR1 and the second direction DR2 to have a fabric shape when viewed in a plan view. Each of the fiber lines FL1 and FL2 may be provided in the form of a bundle in which a plurality of fibers GL are collected. The diameter of a single strand of fibers GL included in one fiber line may be about 3 µm or greater and about 10 µm or less.

Each of the fiber lines FL1 and FL2 may include a reinforced fiber composite. The reinforced fiber composite may be one of carbon fiber-reinforced plastic (CFRP) and glass fiber-reinforced plastic (GFRP). The fiber lines FL1 and FL2 may be disposed inside the matrix MT. The fiber lines FL1 and FL2 of the matrix MT according to an embodiment may include at least one selected from epoxy, polyester, polyamides, polycarbonates, polypropylene, polybutylene, and vinyl ester.

The matrix MT may further include a filler. The filler may include at least one selected from silica, barium sulfate, sintered talc, barium titanate, titanium oxide, clay, alumina, mica, boehmite, zinc borate, and zinc tartrate.

According to an embodiment of the present disclosure, each of base layers BG included in the digitizers DTM and DTM-a (see FIG. 6A and FIG. 6B) may include a fiber bundle of glass fiber reinforced plastic or carbon fiber reinforced plastic disposed inside the matrix MT, thereby protecting the lower portion of the display device DD (see FIG. 5a) when folded.

Accordingly, the digitizers DTM and DTM-a (see FIGS. 6A, and 6B) according to an embodiment of the present disclosure may be configured to function as a protective member and to sense an input of a pen. Accordingly, a separate metal plate for protecting the display device DD may be omitted, thereby reducing costs and providing a slim electronic apparatus ED.

According to embodiments of the present disclosure, even if the loop coils provided in the sensing layers are disposed to be spaced apart from each other while interposing the folding part between the loop coils, the loop coils are connected to each other through the bridge layer. Accordingly, the sensing coils disposed in the folding part may be omitted. Accordingly, the electronic apparatus may be provided with the digitizer improved in sensing sensitivity by omitting sensing coils changed in shape to pass between holes of the folding part.

In such embodiments, the loop coils spaced apart from each other while the folding part is interposed between the loop coils are connected to each other through the bridge layer, and the digitizer is driven through a single circuit board connected to the bridge layer. Accordingly, the number of circuit boards may be reduced to drive the digitizer.

The invention should not be construed as being limited to the embodiments set forth herein. Rather, these embodiments are provided so that this disclosure will be thorough and complete and will fully convey the concept of the invention to those skilled in the art.

While the invention has been described with reference to embodiments thereof, it will be understood by those of ordinary skill in the art that various changes in form and details may be made thereto without departing from the spirit or scope of the invention as defined by the following claims.

What is claimed is:

1. An electronic apparatus comprising:
   a display panel including a folding region folded along a folding axis extending in a first direction, and a first non-folding region and a second non-folding region which are spaced apart from each other in a second direction crossing the first direction, while interposing the folding region therebetween; and
   a digitizer disposed under the display panel, including a first non-folding part overlapping the first non-folding region, a second non-folding part overlapping the second non-folding region, and a folding part overlapping the folding region and provided with a plurality of holes defined therein,
   wherein the digitizer includes:
      a first base layer;
      first loop coils disposed on the first base layer, wherein the first loop coils include first first coils disposed in the first non-folding part and second first coils disposed in the second non-folding part;
      a second base layer disposed under the first base layer;
      second loop coils disposed between the first base layer and the second base layer, wherein the second loop coils include first second coils disposed in the first non-folding part and second second coils disposed in the second non-folding part; and
      bridge patterns disposed under the second base layer, and
   wherein a first first line included in one bridge pattern of the bridge patterns and disposed in the first non-folding part is connected to a first first coil, which corresponds to the first first line, of the first first coils, and a second first line included in the one bridge pattern and disposed in the second non-folding part is connected to the second first coil, which receives a signal the same as a signal of the first first coil, of the second first coils.

2. The electronic apparatus of claim 1, wherein a first second line included in another bridge pattern of the bridge patterns and disposed in the first non-folding part is connected to a first second coil, which corresponds to the first second line, of the first second coils, and a second second line included in the another bridge pattern and disposed in the second non-folding part is connected to a second second coil, which outputs electromagnetic force the same as electromagnetic force of the first second coil, of the second second coils.

3. The electronic apparatus of claim 2, wherein the first loop coils are connected to corresponding bridge patterns of the bridge patterns through first contact holes defined through the first base layer and the second base layer, and wherein the second loop coils are connected to corresponding bridge patterns of the bridge patterns through second contact holes defined through the second base layer.

4. The electronic apparatus of claim 3, wherein the first contact holes and the second contact holes do not overlap the folding part.

5. The electronic apparatus of claim 1, wherein each of the first first coils and the second first coils includes first longer side lines extending in the second direction and spaced apart from each other in the first direction, first shorter side lines spaced apart from each other in the second direction and connected to first longer side lines, which correspond to the first shorter side lines, of the first longer side lines, a first connection part extending from one selected from the first longer side lines and the first shorter side lines, a first contact part connected to an end of the first connection part, a second connection part extending from another one selected from the first longer side lines and the first shorter side lines, and a second contact part connected to an end of the second connection part, and
wherein the first contact part and the second contact part are connected to bridge patterns, which correspond to the first contact part and the second contact part, respectively, of the bridge patterns.

6. The electronic apparatus of claim 5, wherein the second connection part overlaps one selected from the first longer side lines and the first shorter side lines at a first crossing point,
wherein a portion, which is adjacent to the first crossing point, of the second connection part is disposed on the second base layer, and
wherein a remaining portion, which is disposed on the second base layer, of the second connection part is connected to the portion of the second connection part through contact holes defined in the first base layer.

7. The electronic apparatus of claim 5, wherein each of the first second coils and the second second coils includes second longer side lines extending in the first direction and spaced apart from each other in the second direction, second shorter side lines spaced apart from each other in the first direction and connected to second longer side lines, which correspond to the second shorter side lines, of the second longer side lines, a third connection part extending from one selected from the second longer side lines and the second shorter side lines, a third contact part connected to an end of the third connection part, a fourth connection part extending from another one selected from the second longer side lines and the second shorter side lines, and a fourth contact part connected to an end of the fourth connection part, and
wherein the third contact part and the fourth contact part are connected to bridge patterns, which correspond to the third contact part and the fourth contact part, respectively, of the bridge patterns, and do not overlap the first contact part and the second contact part included in each of the first loop coils.

8. The electronic apparatus of claim 7, wherein the fourth connection part overlaps one selected from the second longer side lines and the second shorter side lines at a second crossing point,
a portion, which is adjacent to the second crossing point, of the fourth connection part is disposed under the second base layer, and
a remaining portion of the fourth connection part is connected to the portion of the fourth connection part through contact holes defined in the second base layer.

9. The electronic apparatus of claim 1, wherein the digitizer further includes:
at least one sub-coil disposed in a layer the same as a layer of the second loop coils including:
a first third coil including at least a portion disposed on the folding part adjacent to the first non-folding part; and
a second third coil including at least a portion disposed the folding part adjacent to the second non-folding part.

10. The electronic apparatus of claim 1, wherein the bridge patterns include four or less bridge patterns disposed between two holes, which are adjacent to each other in the first direction, of the holes.

11. The electronic apparatus of claim 1, wherein the holes extend in the first direction, and include a first group hole and a second group hole spaced apart from each other in the first direction, and
wherein the second group hole is spaced apart by a specific distance from the first group hole in the first direction.

12. The electronic apparatus of claim 1, further comprising:
a circuit board disposed under the second base layer overlapping one selected from the first non-folding part and the second non-folding part, and connected to the first loop coils and the second loop coils; and
a bridge board connected to the circuit board.

13. The electronic apparatus of claim 1, wherein the digitizer further includes:
a third base layer disposed under the second base layer; and
sub-bridge patterns including at least a portion overlapping the folding part, connected to bridge patterns, which correspond to the sub-bridge patterns, of the bridge patterns, and disposed on the third base layer.

14. The electronic apparatus of claim 1, wherein each of the first base layer and the second base layer includes:
a matrix including a filler and a reinforced fiber composite disposed in the matrix and including at least one selected from reinforced fiber and carbon fiber.

15. The electronic apparatus of claim 14, wherein the reinforced fiber composite includes:
at least one selected from epoxy, polyester, polyamide, polycarbonate, polypropylene, polybutylene, and vinyl ester, and
wherein the filler includes:
at least one selected from silica, barium sulphate, sintered talc, barium titanate, titanium oxide, clay, alumina, mica, boehmite, zinc borate, and zinc tartrate.

16. The electronic apparatus of claim 1, further comprising:
an adhesive layer interposed between the display panel and the digitizer,
wherein an adhesive opening part is defined in the adhesive layer to be overlapping the folding region.

17. The electronic apparatus of claim 1, further comprising:
a functional layer including a first part and a second part disposed under the digitizer and spaced apart from each other in an overlap region with the folding part,
wherein the functional layer includes:
at least one selected from a heat dissipation layer, a cushion layer, and a shielding layer.

18. The electronic apparatus of claim 11, wherein the digitizer senses an external input through an electromagnetic resonance scheme.

19. The electronic apparatus of claim 11, wherein the display panel includes a first region and a second region surrounding the first region and having a light transmittance lower than a light transmittance of the first region, wherein each of the first region and the second region provides an image, and wherein the electronic apparatus further includes:
a camera module disposed under the digitizer and overlapping the first region.

20. The electronic apparatus of claim 1, further comprising
a first cover layer disposed on the first base layer to cover the first loop coils and a second cover layer disposed under the second base layer to cover the bridge patterns,
wherein the holes are defined through the first cover layer and the second cover layer.

21. An electronic apparatus comprising:
a display panel including a folding region folded along a folding axis extending in a first direction, and a first non-folding region and a second non-folding region which are spaced apart from each other in a second direction crossing the first direction while interposing the folding region therebetween; and
a digitizer including a first non-folding part disposed under the display panel, and overlapping the first non-folding region, a second non-folding part overlapping the second non-folding region, and a folding part overlapping the folding region and provided with a plurality of holes defined therein,
wherein the digitizer includes:
a first base layer;
first loop coils disposed on the first base layer;
a second base layer disposed under the first base layer;
second loop coils interposed between the first base layer and the second base layer; and
bridge patterns disposed under the second base layer,
wherein at least one selected from the first loop coils and the second loop coils overlaps the folding part, and
wherein loop coils, which are spaced apart from each other while interposing the folding part between the loop coils, of the first loop coils and the second loop coils are connected to each other through the bridge patterns.

22. The electronic apparatus of claim 21, wherein four first loop coils or less and four bridge patterns or less are interposed between two holes adjacent to each other in the first direction.

23. The electronic apparatus of claim 21, wherein the second loop coils include:
first coils overlapping the first non-folding part and second coils overlapping the second non-folding part,
wherein each of the first coils and the second coils includes:
longer side lines extending in the first direction and spaced apart from each other in the second direction; and
shorter side lines spaced apart from each other in the first direction and connected to longer side lines, which correspond to the shorter side lines, of the longer side lines, a first connection part extending from one selected from the longer side lines and the shorter side lines, a first contact part connected to an opposite end of the first connection part, a second connection part extending from another one selected from the longer side lines and the shorter side lines, and a second contact part connected to an opposite end of the second connection part, and
wherein the first contact part and the second contact part are connected to bridge patterns, which correspond to the first contact part and the second contact part, of the bridge patterns.

24. The electronic apparatus of claim 23, wherein the second connection part is overlapping one selected from the longer side lines and the shorter side lines at a crossing point, a portion, which is adjacent to the crossing point, of the second connection part is disposed on the second base layer, and a remaining portion of the second connection part is connected to the portion of the second connection part through contact holes defined in the first base layer.

25. The electronic apparatus of claim 21, wherein the digitizer further includes:
at least one sub-coil disposed in a layer the same as a layer of the second loop coils including a first third coil including at least a portion disposed on the folding part adjacent to the first non-folding part, and a second third coil including at least a portion disposed the folding part adjacent to the second non-folding part.

26. The electronic apparatus of claim 21, further comprising:
a circuit board disposed under the second base layer overlapping one of the first non-folding part and the second non-folding part, and connected to the first loop coils and the second loop coils; and
a bridge board connected to the circuit board.

27. The electronic apparatus of claim 21, wherein each of the first base layer and the second base layer includes:
a matrix including a filter; and
a reinforced fiber composite disposed in the matrix and including at least one selected from reinforced fiber and carbon fiber.

28. The electronic apparatus of claim 21, further comprising:
a functional layer including a first part and a second part disposed under the digitizer and spaced apart from each other in an overlap region with the folding part,
wherein the functional layer includes at least one selected from a heat dissipation layer, a cushion layer, and a shielding layer.

29. The electronic apparatus of claim 21, wherein the digitizer senses an external input through an electromagnetic resonance scheme.

30. The electronic apparatus of claim 21, wherein the display panel includes a first region and a second region surrounding the first region and having a light transmittance lower than a light transmittance of the first region, wherein each of the first region and the second region provides an image, and wherein the electronic apparatus further includes:
a camera module disposed under the digitizer and overlapping the first region.

* * * * *